(12) United States Patent
Baustian et al.

(10) Patent No.: US 9,481,842 B2
(45) Date of Patent: Nov. 1, 2016

(54) SYSTEMS AND PROCESSES FOR PRODUCTION OF FUEL AND FUEL BLENDS

(71) Applicants: James J. Baustian, St. Charles, IL (US); Adam J. Schubert, Naperville, IL (US); Paul Beckwith, Winslow (GB)

(72) Inventors: James J. Baustian, St. Charles, IL (US); Adam J. Schubert, Naperville, IL (US); Paul Beckwith, Winslow (GB)

(73) Assignee: Butamax Advanced Biofuels LLC, Wilmington, DE (US)

( * ) Notice: Subject to any disclaimer, the term of this patent is extended or adjusted under 35 U.S.C. 154(b) by 421 days.

(21) Appl. No.: 13/624,669

(22) Filed: Sep. 21, 2012

(65) Prior Publication Data
US 2013/0247453 A1    Sep. 26, 2013

Related U.S. Application Data

(60) Provisional application No. 61/538,560, filed on Sep. 23, 2011.

(51) Int. Cl.

| C10L 1/182 | (2006.01) |
|---|---|
| C10L 1/16 | (2006.01) |
| C10G 3/00 | (2006.01) |
| C10G 35/04 | (2006.01) |
| C10G 63/00 | (2006.01) |
| C10G 65/04 | (2006.01) |
| C10G 65/08 | (2006.01) |
| C10G 69/04 | (2006.01) |
| C10G 69/08 | (2006.01) |
| C10G 11/18 | (2006.01) |

(Continued)

(52) U.S. Cl.
CPC ............... *C10L 1/1824* (2013.01); *C10G 3/00* (2013.01); *C10G 11/18* (2013.01); *C10G 35/04* (2013.01); *C10G 45/02* (2013.01); *C10G 45/44* (2013.01); *C10G 45/58* (2013.01); *C10G 63/00* (2013.01); *C10G 65/043* (2013.01); *C10G 65/08* (2013.01); *C10G 69/04* (2013.01); *C10G 69/08* (2013.01); *C10L 1/023* (2013.01); *C10L 1/1616* (2013.01); *C10G 2300/305* (2013.01); *C10G 2300/4043* (2013.01); *C10G 2300/80* (2013.01); *C10G 2400/02* (2013.01); *C10G 2400/04* (2013.01); *C10L 2200/0415* (2013.01); *C10L 2200/0423* (2013.01); *Y02P 30/20* (2015.11)

(58) Field of Classification Search
USPC ......................................................... 44/451
See application file for complete search history.

(56) References Cited

U.S. PATENT DOCUMENTS

| 8,465,560 B1 | 6/2013 | Wolf |
|---|---|---|
| 8,734,543 B2 | 5/2014 | Baustian |

(Continued)

FOREIGN PATENT DOCUMENTS

| EP | 0235280 | 11/1991 |
|---|---|---|
| WO | WO 87/01384 | 3/1987 |
| WO | WO8701384 | * 3/1987 |

OTHER PUBLICATIONS

U.S. Appl. No. 14/598,569, filed Jan. 16, 2015 (Butamax).

(Continued)

*Primary Examiner* — Walter D Griffin
*Assistant Examiner* — Chantel Graham

(57) ABSTRACT

Systems and processes for the production of fuel and fuel blends involve the production of fuels for blending with one or more alcohols such as ethanol and/or butanol. A method for producing a fuel blend includes blending a light distillate product from an oil refinery with butanol. The fuel blending can be at the oil refinery.

22 Claims, 8 Drawing Sheets

(51) Int. Cl.
*C10G 45/02* (2006.01)
*C10G 45/44* (2006.01)
*C10G 45/58* (2006.01)
*C10L 1/02* (2006.01)

(56) References Cited

U.S. PATENT DOCUMENTS

| | | |
|---|---|---|
| 8,870,983 B2 | 10/2014 | Baustian et al. |
| 8,968,429 B2 | 3/2015 | Baustian et al. |
| 2004/0123516 A1* | 7/2004 | Hull .................. C10L 1/023 44/349 |
| 2006/0162243 A1 | 7/2006 | Wolf |
| 2009/0099401 A1 | 4/2009 | D'Amore et al. |
| 2009/0199464 A1 | 8/2009 | Wolf |
| 2009/0292512 A1 | 11/2009 | Wolf |
| 2010/0307053 A1 | 12/2010 | Kuberka et al. |
| 2011/0023354 A1 | 2/2011 | Wolf |
| 2011/0283604 A1 | 11/2011 | Foster et al. |
| 2012/0144902 A1 | 6/2012 | Torres-Ordonez et al. |
| 2012/0240454 A1 | 9/2012 | Boyd et al. |
| 2013/0180164 A1 | 7/2013 | Wolf |
| 2013/0227878 A1 | 9/2013 | Wolf et al. |
| 2013/0247450 A1 | 9/2013 | Wolf |
| 2014/0005443 A1 | 1/2014 | D'Amore et al. |
| 2014/0030768 A1* | 1/2014 | Medoff ........................ 435/99 |
| 2014/0109467 A1 | 4/2014 | Wolf |
| 2015/0007488 A1 | 1/2015 | Baustian |
| 2015/0007490 A1 | 1/2015 | Torres-Ordonez et al. |
| 2015/0007491 A1 | 1/2015 | Baustian et al. |

OTHER PUBLICATIONS

Yanowitz, et al., Utilization of Renewable Oxygenates as Gasoline Blending Components, Technical Report, National Renewable Energy Laboratory, NREL/TP-5400-50791, pp. 1-47, Aug. 2011.
Ryan, et al., Renewable Solution, Isobutanol—A Renewable Solution for the Transportation Fuels Value Chain, Gevo White Paper, Transportation Fuels, pp. 1-14, May 2011.
Seddon, et al., Octane Enhancing Petrol Additives/Products, Literature and Analysis, pp. 1-76, Sep. 2000.
Kumar, et al., Refinery Configuration and Design Aspects, Engineers India Limited, Petrofed Presentation, May 25, 2010, pp. 1-108.
Yankov, et al., Integration of the Processes FFC Feed Hydrotreatment and FCC Gasoline Posttreatment through the Prime G Process—Opportunity for Production of Euro V Gasolines at Increased Profitability, 45th International Petroleum Conference, Jun. 13, 2011, pp. 1-17.
International Search Report for corresponding International Application No. PCT/US2012/000409, mailed Jan. 24, 2013.

* cited by examiner

SYSTEMS AND PROCESSES FOR PRODUCTION OF FUEL AND FUEL BLENDS

BACKGROUND OF THE INVENTION

Field of the Invention

The present invention relates to the blending of fuels with one or more alcohols. More particularly, the present invention relates to systems and processes for blending ethanol and/or butanol with gasoline which can be at a refinery.

Background Art

Global demand for liquid transportation fuel is projected to strain the ability to meet certain environmentally driven goals, for example, the conservation of oil reserves. Such demand has driven the development of technology which allows utilization of renewable resources to mitigate the depletion of oil reserves. This invention addresses the need for improved alternative fuel compositions and processes which allow for the conservation of oil reserves. Such compositions and processes would satisfy both fuel demands and environmental concerns.

Alcohols such as butanol and ethanol are blended with both finished gasoline and gasoline subgrades (e.g., blendstocks for oxygenate blending). The use of butanol in fuel blends has several advantages over ethanol. For example, because butanol has an energy content closer to that of gasoline, consumers face less of a compromise on fuel economy. Butanol has a low vapor pressure, meaning that it can be easily added to conventional gasoline. Also, butanol's chemical properties allow it to be blended with gasoline and gasoline subgrades at higher concentrations than ethanol. For example, butanol can be blended by at least 16% by volume in gasoline, thereby displacing more gasoline per gallon of fuel consumed than the standard 10% by volume ethanol blend.

Fuel blended directly at an oil refinery can be shipped by pipeline or marine vessel as finished gasoline. It is not desirable to blend alcohols such as ethanol with gasoline or gasoline subgrades directly at an oil refinery because ethanol mixes with the water typically present when shipping by pipeline or marine vessel. Butanol fuel blends are less susceptible to separation in the presence of water than ethanol fuel blends. The transportation of alcohol and fuels to loading terminals for blending incurs additional transportation costs which could be avoided if the alcohol could be blended with the gasoline or gasoline subgrade directly at the refinery.

What are needed are systems and processes for the production of fuels and fuel blends which are economical, and systems and processes in which the fuel blends can be produced. The present invention satisfies these and other needs, and provides further related advantages, as will be made apparent by the description of the embodiments that follow.

BRIEF SUMMARY OF THE INVENTION

The present invention provides systems and processes for producing fuel and fuel blends.

In some embodiments, the present invention provides systems and processes for increasing a distillate product yield from an oil refinery. In one embodiment, the process includes (a) operating an oil refinery to produce a light distillate product and a middle distillate product from crude oil, wherein the oil refinery includes a fluid catalytic cracker (FCC) unit; (b) feeding a feedstock to the FCC unit, wherein the feedstock is derived from the crude oil, wherein the FCC unit is operated at a first cut-point temperature to fractionate the feedstock and produce products including a first FCC product and a second FCC product, wherein the light distillate product includes the first FCC product, and wherein the middle distillate product includes the second FCC product; and (c) blending the light distillate product with an amount of butanol to produce a butanol blended gasoline. The FCC unit is operated at a second cut-point temperature when the oil refinery is operated to produce a different light distillate product for blending with an amount of ethanol for producing an automotive-grade blended gasoline. The first cut-point temperature is lower than a second cut-point temperature. An amount of the middle distillate product when the FCC is operated at the first cut-point temperature is greater than an amount of the middle distillate product when the FCC unit is operated at the second cut-point temperature.

In some embodiments, the present invention provides systems and processes for producing gasoline. In one embodiment, the process includes (a) operating an oil refinery to produce a light distillate product from crude oil; and (b) blending the light distillate product with an amount of butanol to produce a butanol blended gasoline. The light distillate product includes an amount of a light naphtha product comprising pentane, butane, or a mixture thereof. The amount of the light naphtha product is greater than any amount of light naphtha product included in a different light distillate product which is an automotive-grade gasoline free of alcohol fuel or which is for blending with an amount of ethanol to produce an automotive-grade blended gasoline.

In some embodiments, the present invention provides systems and processes for producing a blended gasoline. In one embodiment, the process includes (a) operating an oil refinery to produce a gasoline; and (b) blending the gasoline with an amount of butanol to produce a butanol blended gasoline. The butanol is blended with the gasoline at the oil refinery.

In some embodiments, the present invention provides systems and process for producing a distillate product from an oil refinery. In one embodiment, the process includes (a) operating an oil refinery to produce a light distillate product from crude oil, wherein the oil refinery comprises at least one octane upgrading unit; (b) feeding a naphtha feedstock to the octane upgrading unit to convert the naphtha feedstock to an upgraded naphtha product having a higher octane than an octane of the naphtha feedstock, wherein the light distillate product includes the upgraded naphtha product; and (c) blending the light distillate product with an amount of butanol to produce a butanol blended gasoline. A throughput for the octane upgrading unit is less than a throughput for the octane upgrading unit when the oil refinery is operated to produce a different light distillate product which is an automotive-grade gasoline free of alcohol fuel or which is for blending with an amount of ethanol to produce an automotive-grade blended gasoline.

In another embodiment, the process includes (a) operating an oil refinery to produce a light distillate product from crude oil, wherein the oil refinery comprises at least one hydrotreater unit; (b) feeding a feedstock to the hydrotreater unit, the feedstock being derived from the crude oil; (c) treating the feedstock in the hydrotreater unit to reduce a sulfur content of the feedstock to produce a hydrotreated product, wherein the light distillate product includes the hydrotreated product; and (d) blending the light distillate product with an amount of butanol to produce a butanol blended gasoline. A throughput for the hydrotreater is less than a throughput for the hydrotreater when the oil refinery is operated to produce a different light distillate product. The different light distillate product is an automotive-grade gasoline free of alcohol fuel or which is for blending with an amount of ethanol to produce an automotive-grade blended gasoline.

In some embodiments, the invention is directed to a method for operating an oil refinery comprising a fluid catalytic cracker (FCC) unit to produce a blend comprising a light distillate product and butanol, wherein the method comprises (a) operating an oil refinery to produce the light distillate product and a middle distillate product from crude oil; (b) feeding a feedstock to the FCC unit, wherein the feedstock is derived from the crude oil, wherein the FCC unit is operated at a first cut-point temperature of about 350° F. to about 420° F. to produce products including a first FCC product and a second FCC product, wherein the light distillate product includes the first FCC product, and wherein the middle distillate product includes the second FCC product; and (c) blending the light distillate product with an amount of butanol to produce a butanol blended gasoline.

In some embodiments, the invention is directed to method for producing a butanol blended gasoline, comprising (a) operating an oil refinery to produce a light distillate product from crude oil, wherein the oil refinery comprises at least one octane upgrading unit; (b) feeding a naphtha feedstock to the octane upgrading unit to convert the naphtha feedstock to an upgraded naphtha product having a higher octane than an octane of the naphtha feedstock, wherein the light distillate product includes the upgraded naphtha product; and (c) blending the light distillate product with an amount of butanol to produce a butanol blended gasoline, wherein the amount of upgraded naphtha product in the butanol blended gasoline is from about 10% to about 50% by volume of the gasoline.

In some embodiments, the invention is directed to a method of increasing the efficiency and profitability of an oil refinery producing oxygenated gasoline blends, comprising blending butanol with a gasoline blend stock to form a butanol-gasoline blend, wherein the gasoline blend stock is produced comprising using a fluid catalytic cracker (FCC) cut-point that is about 350° F. to about 420° F.

In some embodiments, the invention is directed to a method for producing a butanol blended gasoline, comprising (a) operating an oil refinery to produce a light distillate product from crude oil; (b) operating the refinery to produce an upgraded naphtha product, wherein the light distillate product comprises the upgraded naphtha product; and (c) forming a blend of at least the light distillate product and an amount of butanol to produce a butanol blended gasoline, wherein the amount of upgraded naphtha product in the butanol blended gasoline is from about 10% to about 50% by volume of the gasoline. Further embodiments, features, and advantages of the invention, as well as the structure and operation of the various embodiments of the invention are described in detail below with reference to accompanying drawings.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention. In the drawings, like reference numbers indicate identical or functionally similar elements.

DETAILED DESCRIPTION OF THE INVENTION

Figure 1:
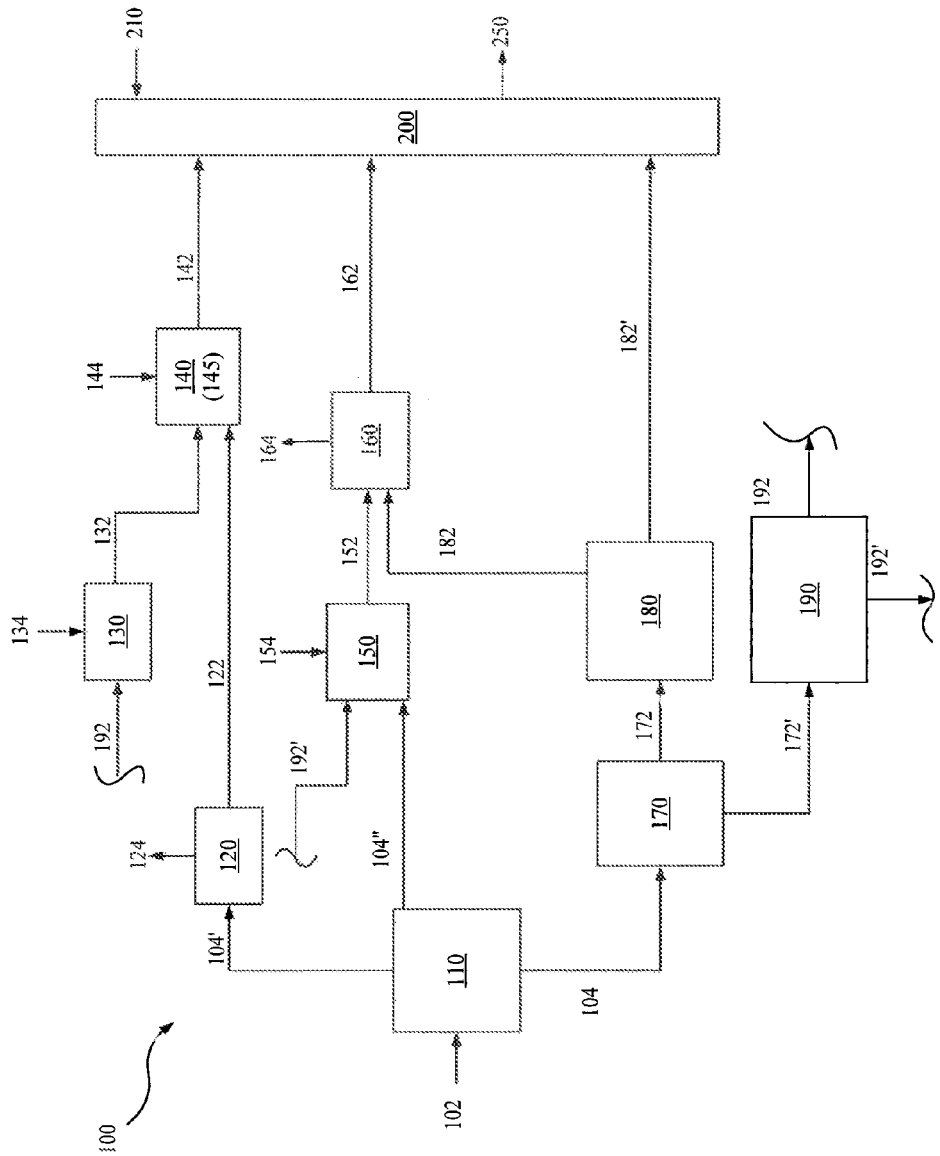
FIG. 1 illustrates a system useful for practicing a process in accordance with an embodiment of the present invention.

Unless defined otherwise, all technical and scientific terms used herein have the same meaning as commonly understood by one of ordinary skill in the art to which this invention belongs. In case of conflict, the present application including the definitions will control. Also, unless otherwise required by context, singular terms shall include pluralities and plural terms shall include the singular. All publications, patents and other references mentioned herein are incorporated by reference in their entireties for all purposes.

In order to further define this invention, the following terms and definitions are herein provided.

As used herein, the terms "comprises," "comprising," "includes," "including," "has," "having," "contains" or "containing," or any other variation thereof, will be understood to imply the inclusion of a stated integer or group of integers but not the exclusion of any other integer or group of integers. For example, a composition, a mixture, a process, a method, an article, or an apparatus that comprises a list of elements is not necessarily limited to only those elements but may include other elements not expressly listed or inherent to such composition, mixture, process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

As used herein, the term "consists of," or variations such as "consist of" or "consisting of," as used throughout the specification and claims, indicate the inclusion of any recited integer or group of integers, but that no additional integer or group of integers may be added to the specified method, structure, or composition.

As used herein, the term "consists essentially of," or variations such as "consist essentially of" or "consisting essentially of," as used throughout the specification and claims, indicate the inclusion of any recited integer or group of integers, and the optional inclusion of any recited integer or group of integers that do not materially change the basic or novel properties of the specified method, structure or composition.

Also, the indefinite articles "a" and "an" preceding an element or component of the invention are intended to be nonrestrictive regarding the number of instances, i.e., occurrences of the element or component. Therefore "a" or "an" should be read to include one or at least one, and the singular word form of the element or component also includes the plural unless the number is obviously meant to be singular.

The terms "invention" or "present invention" as used herein is a non-limiting term and is not intended to refer to any single embodiment of the particular invention but encompasses all possible embodiments as described in the application.

As used herein, the term "about" modifying the quantity of an ingredient or reactant of the invention employed refers to variation in the numerical quantity that can occur, for example, through typical measuring and liquid handling procedures used for making concentrates or solutions in the real world; through inadvertent error in these procedures; through differences in the manufacture, source, or purity of the ingredients employed to make the compositions or to carry out the methods; and the like. The term "about" also encompasses amounts that differ due to different equilibrium conditions for a composition resulting from a particular initial mixture. Whether or not modified by the term "about", the claims include equivalents to the quantities. In one embodiment, the term "about" means within 10% of the reported numerical value; in another embodiment, within 5% of the reported numerical value.

The term "alcohol" as used herein refers to any of a series of hydroxyl compounds, the simplest of which are derived from saturated hydrocarbons, having the general formula $C_nH_{2n+1}OH$. Examples of alcohol include ethanol and butanol.

The term "butanol" as used herein, refers to n-butanol, 2-butanol, isobutanol, tert-butyl alcohol, individually or any mixtures thereof. Butanol can be from a biological source (i.e., biobutanol), for example.

The terms "fuel blend" and "blended fuel" as used herein, refer to any material that can be used to generate energy to produce mechanical work in a controlled manner and that contains one or more alcohols. Examples of fuel blends include, but are not limited to, gasoline blends, diesel blends and jet fuel blends. It is understood that the specific components and allowances of suitable fuel blends can vary based on seasonal (e.g., winter or summer grade) and regional guidelines and technical standards, and can be based, at least in part, on the allowances, guidelines and/or standards for fuels that are not blended with alcohols or for ethanol blended fuels.

The terms "gasoline blend" and "blended gasoline" as used herein, refer to a mixture containing a gasoline subgrade and one or more alcohols that forms a finished gasoline. The term "gasoline subgrade" can include, for example, mixtures of liquid hydrocarbons such as cracked naphtha, reformate, virgin naphtha, isomerate, and/or alkylate, as well as other gasoline blending components intended for blending with oxygenates and/or alcohol (e.g., blendstocks for oxygenate blending). It is understood that the specific components and allowances of suitable gasoline blends can vary based on seasonal (e.g., winter or summer grade) and regional guidelines and technical standards, and can be based, at least in part, on the allowances, guidelines and/or standards for gasolines that are not blended with alcohols or for ethanol blended gasolines.

The terms "American Society for Testing and Materials" and "ASTM" as used herein, refer to the international standards organization that develops and publishes voluntary consensus technical standards for a wide range of materials, products, systems, and services, including fuels.

The term "octane rating" as used herein, refers to the measurement of the resistance of a fuel to auto-ignition in spark ignition internal combustion engines or to the measure of a fuel's tendency to burn in a controlled manner. An octane rating can be a research octane number (RON) or a motor octane number (MON). RON refers to the measurement determined by running the fuel in a test engine with a variable compression ratio under controlled conditions, and comparing the results with those for mixtures of iso-octane and n-heptane. MON refers to the measurement determined using a similar test to that used in RON testing, but with a preheated fuel mixture, a higher engine speed, and ignition timing adjusted depending on compression ratio.

The term "vapor pressure" as used herein, refers to the pressure of a vapor in thermodynamic equilibrium with its condensed phases in a closed system.

The terms "Reid vapor pressure" and "Rvp" as used herein, refers to the absolute vapor pressure exerted by a liquid at 100° F. (37.8° C.) as determined by the test method ASTM D-323.

The term "straight-run" as used herein in reference to a refinery stream, is a stream that has not been modified by a process such as cracking, polymerization, or alkylation, for example.

The term "naphtha" refers to a number of different flammable liquid mixtures of hydrocarbons, for example, a distillation product from petroleum or coal tar boiling in a certain range and containing certain hydrocarbons. Naphtha can be, for example, "light naphtha" or "heavy naphtha." Heavy naphtha contains denser types of napthas and are typically richer in napthenes and aromatics. Light naphtha contains less dense types of napthas and has a higher paraffin content. Light naphtha can contain pentane, butane, or any mixtures thereof. Naphtha can also be, for example, "upgraded naphtha". Upgraded naphtha is a naphtha stream that has been processed by one or more octane upgrading units.

The term "crude oil" refers to a mixture of naturally occurring hydrocarbons that is refined into diesel, gasoline, heating oil, jet fuel, kerosene, or other petrochemical products. Crude oils are named according to their contents and origins, and classified according to their per unit weight (specific gravity).

A "distillation column" separates the components of crude oil based on differences in the volatilities of the components of the crude oil in a boiling liquid mixture. A "distillate" contains the products of distillation. A distillate can be a "light distillate," "middle distillate," or a "heavy distillate." A light distillate fractions near the top of the distillation column and has a lower boiling point than the lower fractions of the distillation column. An example of a light distillate is a light naphtha. A middle distillate fractions near the middle of the distillation column and has a lower boiling point than the lower fractions of the distillation column. Examples of a middle distillate include kerosene and diesel. A heavy distillate is a fraction near the bottom of the distillation column having a higher boiling point than the upper fractions of the distillation column. Examples of a heavy distillate include heavy fuel oil, lubricating oils, wax and asphalt.

A distillation column can be, for example, a "vacuum distillation column" or an "atmospheric distillation column." In an atmospheric distillation column, the pressure above the mixture to be distilled is reduced to less than its vapor pressure (less than atmospheric pressure) causing evaporation of the most volatile liquid(s) (those with the lowest boiling points). Atmospheric distillation works on the principle that boiling occurs when the vapor pressure of a liquid exceeds the ambient pressure. In a vacuum distillation column, the pressure at which such compounds are boiled can be lowered with a vacuum instead of increasing the temperature to boil compounds with higher boiling points. Vacuum distillation is used with or without heating the mixture. In some embodiments, vacuum distillation can be used to further distill heavy fractions resulting from atmospheric distillation.

A "reformer unit" converts naphthas and/or other low octane gasoline fractions into higher octane stocks, for example, converting straight chain paraffins into aromatics. A "reformate stream" containing higher octane stocks is the output of a reformer unit.

A "hydrotreater unit" can perform a number of diverse processes including, for example, the conversion of benzene to cyclohexane, aromatics to naphthas, and the reduction of sulfur and nitrogen levels. As used herein, hydrotreater unit includes desulfurization. A "hydrotreated stream" is the output of a hydrotreater unit.

A "coker unit" converts the residual oil from a vacuum distillation column or the atmospheric distillation column into low molecular weight hydrocarbon. A "coker stream" is the output of a coker unit.

An "isomerization unit" converts and rearranges the molecules of straight chain paraffins (typically low octane hydrocarbons) into branched isomers (typically high octane hydrocarbons). An isomerization unit can be a separate unit from a benzene saturation unit or can be in the same unit as a benzene saturation unit. An "isomerate" is the output of an isomerization unit.

A "benzene saturation unit" converts benzene to cyclohexane. A benzene saturation unit can be integrated with an isomerization unit.

A "debutanizer/depentanizer unit" is a fractionating column for removal of pentane and lighter fractions from a hydrocarbon mixture. A "debutanized/depentanized stream" is the output of a debutanizing/depentanizing unit.

A "cracking unit" is an apparatus which breaks down complex heavy hydrocarbons into simpler molecules, such as light hydrocarbons, by the breaking of carbon-carbon bonds in the precursors. Cracking can be performed, for example, by a fluid catalytic cracking unit (FCC unit), hydrocracker unit, or thermal cracking (steam cracking) unit. A "cracked stream" is the output of a cracking unit.

An FCC unit is an apparatus which breaks down complex heavy hydrocarbons typically using high temperature, moderate pressure and a fluidized powdered catalyst. An "FCC stream" is the output of an FCC unit.

A hydrocracker unit is an apparatus which breaks down heavy hydrocarbons typically using moderate temperature, elevated pressure and a bifunctional catalyst capable of rearranging and breaking hydrocarbon chains and adding hydrogen to aromatics and olefins to produce naphthenes and alkanes. Hydrogen is consumed during hydrocracking Hydrocracking results in the purification of the input stream of sulfur and nitrogen heteroatoms. A "hydrocracked stream" is the output of a hydrocracker unit.

The terms "cut-point" and "cut-point temperature" refer to a temperature, or range of temperatures, during fractionation of a crude oil or crude oil derived feed that correspond to both: (i) the final boiling temperature of the lighter distillate product fraction (i.e., the product fraction with the lower boiling temperature range); and (ii) the initial boiling temperature of the heavier distillate product fraction (i.e., the fraction with the higher boiling temperature range). Fractionation of the crude oil or crude oil derived feed can be carried out in any manner known to those skilled in the art, including, but not limited to, distillation techniques.

The present invention provides systems and processes for producing fuel and fuel blends with alcohol.

Alcohols such as ethanol and butanol have relatively high octane values compared to the other components typically found in gasoline. As such, embodiments of the systems and processes of the present invention have advantages over systems and process that do not include blending fuel with alcohol because they reduce demand on an octane upgrading process at a refinery, such as reforming, isomerization and/or benzene saturation processes. Examples of a reduced demand on an octane upgrading process at a refinery include, for example, reduced throughput through one or more octane upgrading units and/or reduced severity at one or more octane upgrading units. Such reduced demand results in lower refinery operation costs, including reduced costs for energy, process catalysts, and ancillary processes (e.g., water and waste processing), and reduced frequency of unit maintenance, resulting in increased operating factors (e.g., a refinery having more days on stream per year).

Ethanol fuel blends sold as gasoline often contain from 5% to 10% ethanol. The concentration of butanol in gasoline can be about 60% greater than the concentration of ethanol, which means that the equivalent gasoline can contain from about 8% to about 16% butanol, or greater (e.g., about 24%). In some embodiments, the systems and processes of the present invention have an advantage over systems and processes that do not include blending of alcohol with fuel, because the blending of alcohol with fuel results in the dilution of the fuel, thereby decreasing the amount of undesirable controlled substances found in crude oil in the finished fuel. In some embodiments, a butanol fuel blend has a further advantage compared to an ethanol fuel blend, because the higher allowable blending concentration of butanol further reduces the amount of undesirable controlled substances in gasoline that are found in crude oil in the finished fuel. Such undesirable substances include, for example, sulfur and benzene. Reducing the amount of such undesirable substances in a fuel is advantageous for emissions control (e.g., exhaust and/or evaporative emissions). In addition, the reducing the amount of sulfur has the further advantage of reducing the severity and throughput of refinery units which remove sulfur, for example, the naphtha hydrotreating units. The reduced amount of sulfur and severity and throughput on refinery units which remove sulfur have the advantages of reduced hydrogen consumption, process catalysts and energy consumption by a refinery. It should be understood that similar advantages can be realized for embodiments of the invention related to the operation of, for example, the isomerization and benzene saturation units.

In some embodiments, the systems and processes of the present invention have the advantage of allowing a greater amount of light naphtha products to be blended into a fuel (e.g., a gasoline) while meeting fuel specifications. For example, the maximum vapor pressure of gasoline is regulated by known specifications to typically relatively low vapor pressure levels. Such regulations constrain refinery flexibility. Fuel components having a relatively high vapor pressure, such as light naphtha, pentane and butane, for example, constrain refinery processes because such components cannot be blended with fuels without exceeding the maximum regulated vapor pressure limit. Thus, such fuel components are typically considered waste by-products of a refinery process that, at best, can be sold for other purposes at low value to the refinery. Ethanol has a relatively higher blending vapor pressure (approximately 19 psi) compared to butanol (approximately 5-6 psi). The relatively lower blending vapor pressure of butanol has an advantage over ethanol in fuel blending systems and processes, because butanol blending allows more light naphtha products to be blended with a gasoline without exceeding the maximum regulated vapor pressure limits. Thus, butanol fuel blending processes and systems of the present invention have the additional advantage of allowing the utilization of greater amounts of fuel components having a relatively high vapor pressure, without exceeding the maximum regulated vapor pressure limit, compared to ethanol fuel blending. As such, butanol fuel blending processes and systems of the present invention have the additional advantage of allowing the utilization of greater amounts of fuel components having a relatively high vapor pressure, for gasoline blending (regarded as higher value to a refinery) rather than considering such fuel components as waste by-products (regarded as lower value to a refinery).

In some embodiments, systems and processes of the present invention increase a distillate product yield, such as a diesel, from an oil refinery. In some embodiments, the systems and processes of the present invention comprising alcohol fuel blends (e.g., butanol fuel blends or isobutanol fuel blends) increase distillate yield by at least about 0.1%, at least about 0.2%, at least about 0.3%, at least about 0.4%, at least about 0.5%, at least about 0.6%, at least about 0.7%, at least about 0.8%, at least about 0.9%, at least about 1%, at least about 2%, at least about 3%, at least about 4%, at least about 5%, at least about 6%, at least about 7%, at least about 8%, at least about 9%, at least about 10%, at least about 11%, at least about 12%, at least about 13%, at least about 14%, at least about 15%, at least about 16%, at least about 17%, at least about 18%, at least about 19%, or at least about 20%, compared to systems and processes that do not comprise alcohol fuel blends. In some embodiments, the systems and processes of the present invention comprising alcohol fuel blends increase distillate yield in any range of the values described herein, for example, from about 0.1% to about 20%, from about 0.1% to about 15%, from about 0.1% to about 10%, from about 0.1% to about 5%, from about 0.1% to about 1%, from about 1% to about 20%, from about 1% to about 15%, from about 1% to about 10%, from about 1% to about 5%, from about 5% to about 20%, from about 5% to about 10%, or from about 4% to about 7%, compared to systems and processes that do not comprise alcohol fuel blends. In some embodiments, the resulting fuel blend is summer grade or summer grade equivalent. In some embodiments, the resulting fuel blend is winter grade or winter grade equivalent. In some embodiments, the resulting fuel blend is a conventional gasoline, reformulated gasoline (RFG), California reformulated gasoline (CARB), or equivalent thereof. In some embodiments, the oil refinery is in the gulf coast region of the U.S., the midwest region of the U.S., the California region of the U.S., or northwest Europe.

In some embodiments, the systems and processes of the present invention increase diesel yield by at least about 0.1%, at least about 0.2%, at least about 0.3%, at least about 0.4%, at least about 0.5%, at least about 0.6%, at least about 0.7%, at least about 0.8%, at least about 0.9%, at least about 1%, at least about 2%, at least about 3%, at least about 4%, at least about 5%, at least about 6%, at least about 7%, at least about 8%, at least about 9%, at least about 10%, at least about 11%, at least about 12%, at least about 13%, at least about 14%, at least about 15%, at least about 16%, at least about 17%, at least about 18%, at least about 19%, or at least about 20%, compared to systems and processes that do not comprise alcohol fuel blends. In some embodiments, the systems and processes of the present invention increase diesel yield in any range of the values described herein, for example, from about 0.1% to about 20%, from about 0.1% to about 15%, from about 0.1% to about 10%, from about 0.1% to about 5%, from about 0.1% to about 1%, from about 1% to about 20%, from about 1% to about 15%, from about 1% to about 10%, from about 1% to about 5%, from about 5% to about 20%, from about 5% to about 10%, or from about 4% to about 7%, compared to systems and processes that do not comprise alcohol fuel blends. In some embodiments, the resulting fuel blend is summer grade or summer grade equivalent. In some embodiments, the resulting fuel blend is winter grade or winter grade equivalent. In some embodiments, the resulting fuel blend is a conventional gasoline, RFG, CARB, or equivalent thereof. In some embodiments, the oil refinery is in the gulf coast region of the U.S., the midwest region of the U.S., the California region of the U.S., or northwest Europe.

In some embodiments, the systems and processes of the present invention comprising blending of distillate with butanol (e.g., isobutanol) increase distillate yield by at least 0.1%, at least 0.2%, at least 0.3%, at least 0.4%, at least 0.5%, at least 0.6%, at least 0.7%, at least 0.8%, at least 0.9%, at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, or at least 20%, compared to the distillate yield from systems and processes comprising blending of distillate with ethanol. In some embodiments, the systems and processes of the present invention comprising blending of distillate with butanol increase distillate yield in any range of the values described herein, for example, from about 0.1% to about 20%, from about 0.1% to about 15%, from about 0.1% to about 10%, from about 0.1% to about 5%, from about 0.1% to about 1%, from about 1% to about 20%, from about 1% to about 15%, from about 1% to about 10%, from about 1% to about 5%, from about 5% to about 20%, from about 5% to about 10%, or from about 4% to about 7%, compared to systems and processes comprising blending of distillate with ethanol. In some embodiments, the resulting fuel blend is summer grade or summer grade equivalent. In some embodiments, the resulting fuel blend is winter grade or winter grade equivalent. In some embodiments, the resulting fuel blend is a conventional gasoline, RFG, CARB, or equivalent thereof. In some embodiments, the resulting fuel is Euro-5 gasoline or equivalent thereof. In some embodiments, the oil refinery is in the gulf coast region of the U.S., the midwest region of the U.S., the California region of the U.S., or northwest Europe.

In some embodiments, the systems and processes of the present invention comprising butanol diesel blends (e.g., isobutanol) increase diesel yield by at least 0.1%, at least 0.2%, at least 0.3%, at least 0.4%, at least 0.5%, at least 0.6%, at least 0.7%, at least 0.8%, at least 0.9%, at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, or at least 20%, compared to the diesel yield from systems and processes comprising ethanol diesel blends. In some embodiments, the systems and processes of the present invention comprising butanol diesel blends (e.g., isobutanol) increase distillate yield in any range of the values described herein, for example, from about 0.1% to about 20%, from about 0.1% to about 15%, from about 0.1% to about 10%, from about 0.1% to about 5%, from about 0.1% to about 1%, from about 1% to about 20%, from about 1% to about 15%, from about 1% to about 10%, from about 1% to about 5%, from about 5% to about 20%, from about 5% to about 10%, or from about 4% to about 7%, compared to systems and processes comprising ethanol diesel blends. In some embodiments, the resulting fuel blend is summer grade or summer grade equivalent. In some embodiments, the resulting fuel blend is winter grade or winter grade equivalent. In some embodiments, the oil refinery is in the gulf coast region of the U.S., the midwest region of the U.S., the California region of the U.S., or northwest Europe.

To compensate for the relatively higher blending vapor pressure of ethanol, refineries typically raise the distillation cut-point between FCC naphthas (used in gasoline) and cycle oils (used in diesel) in the FCC unit. Increasing the cut-point directs more lower vapor pressure material into the FCC heavy naphtha, thereby offsetting ethanol's high vapor pressure to keep the gasoline below specification limits. Raising the FCC naphtha/cycle oil cut-point has several disadvantages: (i) diesel product volume is reduced, which results in lower overall value of the refinery's products because diesel is more valuable than gasoline; (ii) octane processing increases because the low vapor pressure material added to FCC heavy naphtha is low octane, thereby offsetting some of the octane processing advantage discussed above; and (iii) throughput and severity at the FCC Naphtha Hydrotreater are increased because more volume of relatively high sulfur material is being processed into the FCC heavy naphtha. In accordance with some embodiments presented herein, a gasoline or gasoline subgrade is produced for blending with butanol, in which butanol's relatively lower vapor pressure alleviates the need to source low vapor pressure material from the FCC heavy naphtha. Thus, in some embodiments, the FCC unit is operated at lower FCC cut-points than could otherwise be allowed if the gasoline or gasoline subgrade was produced for blending with ethanol, for example. Lower FCC cut-points have the advantage of allowing more hydrocarbon material to be directed to FCC light cycle oil (diesel) and less to FCC heavy naphtha (gasoline). As such, embodiments of the systems and processes of the present invention which include blending butanol with fuels have refining advantages over non-alcohol and ethanol fuel blending systems and processes because they increase diesel fuel volume, reduce octane processing, and lower naphtha hydrotreating demand.

In one embodiment, a process for increasing a distillate product yield from an oil refinery includes (a) operating an oil refinery to produce a light distillate product and a middle distillate product from crude oil, wherein the oil refinery includes a fluid catalytic cracker (FCC) unit; (b) feeding a feedstock to the FCC unit, wherein the feedstock is derived from the crude oil, wherein the FCC unit is operated at a first cut-point temperature to fractionate the feedstock and produce products including a first FCC product and a second FCC product, wherein the light distillate product includes the first FCC product, and wherein the middle distillate product includes the second FCC product; and (c) blending the light distillate product with an amount of butanol to produce a butanol blended gasoline. The FCC unit is operated at a second cut-point temperature when the oil refinery is operated to produce a different light distillate product for blending with an amount of ethanol for producing an automotive-grade blended gasoline. The first cut-point temperature is lower than a second cut-point temperature. An amount of the middle distillate product when the FCC is operated at the first cut-point temperature is greater than an amount of the middle distillate product when the FCC unit is operated at the second cut-point temperature. In some embodiments, the middle distillate product comprises diesel fuel. In some embodiments, the light distillate product comprises gasoline. In some embodiments, the first cut-point temperature is at least about 300° F., at least about 305° F., at least about 310° F., at least about 315° F., at least about 320° F., at least about 325° F., at least about 330° F., at least about 335° F., at least about 340° F., at least about 341° F., at least about 342° F., at least about 343° F., at least about 344° F., at least about 345° F., at least about 346° F., at least about 347° F., at least about 348° F., at least about 349° F., at least about 350° F., at least about 351° F., at least about 352° F., at least about 353° F., at least about 354° F., at least about 355° F., at least about 356° F., at least about 357° F., at least about 358° F., at least about 359° F., at least about 360° F., at least about 361° F., at least about 362° F., at least about 363° F., at least about 364° F., at least about 365° F., at least about 366° F., at least about 367° F., at least about 368° F., at least about 369° F., at least about 370° F., at least about 371° F., at least about 372° F., at least about 373° F., at least about 374° F., at least about 375° F., at least about 376° F., at least about 377° F., at least about 378° F., at least about 379° F., at least about 380° F., at least about 385° F., at least about 390° F., at least about 395° F., at least about 400° F., at least about 405° F., at least about 410° F., at least about 415° F., or at least about 420° F. In some embodiments, the first cut-point temperature is any range of values described herein, for example, from about 300° F. to about 420° F., from about 320° F. to about 420° F., from about 330° F. to about 420° F., from about 340° F. to about 420° F., from about 350° F. to about 420° F., from about 300° F. to about 400° F., from about 310° F. to about 400° F., from about 320° F. to about 400° F., from about 330° F. to about 400° F., from about 340° F. to about 400° F., from about 350° F. to about 400° F., from about 300° F. to about 390° F., from about 310° F. to about 390° F., from about 320° F. to about 390° F., from about 330° F. to about 390° F., from about 340° F. to about 390° F., from about 350° F. to about 390° F., from about 300° F. to about 380° F., from about 310° F. to about 380° F., from about 320° F. to about 380° F., from about 330° F. to about 380° F., from about 340° F. to about 380° F., from about 350° F. to about 380° F., or from about 351° F. to about 373° F. In some embodiments of such systems and processes of the present invention, the distillate product is blended with butanol (e.g., isobutanol). In some embodiments, the resulting fuel blend is summer grade or summer grade equivalent. In some embodiments, the resulting fuel blend is winter grade or winter grade equivalent. In some embodiments, the oil refinery is in the gulf coast region of the U.S., the midwest region of the U.S., the California region of the U.S., or northwest Europe. In some embodiments, the difference between the second cut-point temperature and the first cut-point temperature is at least about 5° F., at least about 10° F., at least about 15° F., at least about 20° F., at least about 21° F., at least about 22° F., at least about 23° F., at least about 24° F., at least about 25° F., at least about 26° F., at least about 27° F., at least about 28° F., at least about 29° F., at least about 30° F., at least about 31° F., at least about 32° F., at least about 33° F., at least about 34° F., at least about 35° F., at least about 36° F., at least about 37° F., at least about 38° F., at least about 39° F., at least about 40° F., at least about 41° F., at least about 42° F., at least about 43° F., at least about 44° F., at least about 45° F., at least about 46° F., at least about 47° F., at least about 48° F., at least about 49° F., at least about 50° F., at least about 51° F., at least about 52° F., at least about 53° F., at least about 54° F., at least about 55° F., at least about 56° F., at least about 57° F., at least about 58° F., at least about 59° F., at least about 60° F., at least about 61° F., at least about 62° F., at least about 63° F., at least about 64° F., at least about 65° F., at least about 66° F., at least about 67° F., at least about 68° F., at least about 69° F., at least about 70° F., at least about 71° F., at least about 72° F., at least about 73° F., at least about 74° F., at least about 75° F., at least about 76° F., at least about 77° F., at least about 78° F., at least about 79° F., at least about 80° F., at least about 81° F., at least about 82° F., at least about 83° F., at least about 84° F., at least about 85° F., at least about 86° F., at least about 87° F., at least about 88° F., at least about 89° F., at least about 90° F., at least about 95° F., or at least about 100° F. In some embodiments, the difference between the second cut-point temperature and the first cut-point temperature is any range of values described herein, for example, from about 5° F. to about 100° F., from about 10° F. to about 100° F., from about 15° F. to about 100° F., from about 20° F. to about 100° F., from about 25° F. to about 100° F., from about 30° F. to about 100° F., from about 5° F. to about 90° F., from about 10° F. to about 90° F., from about 15° F. to about 90° F., from about 20° F. to about 90° F., from about 30° F. to about 90° F., from about 5° F. to about 80° F., from about 10° F. to about 80° F., from about 15° F. to about 80° F., from about 20° F. to about 80° F., from about 30° F. to about 80° F., or from about 31° F. to about 78° F. In some embodiments of such systems and processes of the present invention, the distillate product is blended with butanol (e.g., isobutanol). In some embodiments, the resulting fuel blend is summer grade or summer grade equivalent. In some embodiments, the resulting fuel blend is winter grade or winter grade equivalent. In some embodiments, the oil refinery is in the gulf coast region of the U.S., the midwest region of the U.S., the California region of the U.S., or northwest Europe.

In some embodiments, the invention is directed to a method for operating an oil refinery comprising a fluid catalytic cracker (FCC) unit to produce a blend comprising a light distillate product and butanol, the method comprising (a) operating an oil refinery to produce the light distillate product and a middle distillate product from crude oil; (b) feeding a feedstock to the FCC unit, wherein the feedstock is derived from the crude oil, wherein the FCC unit is operated at a first cut-point temperature of from about 350° F. to about 420° F. to produce products including a first FCC product and a second FCC product, wherein the light distillate product includes the first FCC product, and wherein the middle distillate product includes the second FCC product; and (c) blending the light distillate product with an amount of butanol to produce a butanol blended gasoline. In some embodiments, the first cut-point temperature is a first cut-point temperature that is disclosed herein, for example, from about 350° F. to about 400° F., from about 350° F. to about 390° F., from about 350° F. to about 380° F., or from about 351° F. to about 373° F.

In some embodiments, the invention is directed to a method of increasing the efficiency and profitability of an oil refinery producing oxygenated gasoline blends, the method comprising blending butanol with a gasoline blend stock to form a butanol-gasoline blend, wherein the gasoline blend stock is produced comprising using a fluid catalytic cracker (FCC) cut-point that is disclosed herein, for example, from about 350° F. to about 420° F., from about 350° F. to about 400° F., from about 350° F. to about 390° F., from about 350° F. to about 380° F., or from about 351° F. to about 373° F.

In some embodiments, the oil refinery further comprises an FCC hydrotreater unit. In some embodiments, the method further comprises treating the first FCC product in the FCC hydrotreater unit to reduce a sulfur content of the first FCC product. In some embodiments, a throughput for the FCC hydrotreater is less than a throughput for the FCC hydrotreater when the oil refinery is operated to produce the different light distillate product for blending with the amount of ethanol. In some embodiments, the method further comprises treating the second FCC product to reduce a sulfur content of the second FCC product. In some embodiments, the oil refinery further comprises one or more octane upgrading units, wherein a throughput for octane upgrading unit is less than a throughput for the octane upgrading unit when the oil refinery is operated to produce the different light distillate product for blending with the amount of ethanol.

In some embodiments, the present invention provides systems and processes for producing gasoline. In one embodiment, the process includes (a) operating an oil refinery to produce a light distillate product from crude oil; and (b) blending the light distillate product with an amount of butanol to produce a butanol blended gasoline. In some embodiments, the light distillate product includes an amount of a light naphtha product comprising pentane, butane, or a mixture thereof. In some embodiments, the amount of the light naphtha product is greater than any amount of light naphtha product included in a different light distillate product which is an automotive-grade gasoline free of alcohol fuel or which is for blending with an amount of ethanol to produce an automotive-grade blended gasoline. In some embodiments, the light distillate product comprises gasoline.

In some embodiments, the systems and processes of the present invention have increased light naphtha and/or butane utilization. In some embodiments, the systems and processes of the present invention comprising butanol (e.g., isobutanol) fuel blends have increased light naphtha and/or butane utilization compared to systems and processes comprising ethanol fuel blends or to systems and processes that do not comprise alcohol fuel blends. In some embodiments, the systems and processes of the present invention comprising butanol (e.g., isobutanol) gasoline blends have increased light naphtha and/or butane utilization compared to systems and processes comprising ethanol gasoline blends or to systems and processes that do not comprise alcohol fuel blends. In some embodiments, the resulting fuel blend of the present systems and processes is summer grade or summer grade equivalent. In some embodiments, the resulting fuel blend is winter grade or winter grade equivalent. In some embodiments, the resulting fuel blend is a conventional gasoline, RFG, CARB, or equivalent thereof. In some embodiments, the resulting fuel is Euro-5 gasoline or equivalent thereof. In some embodiments, the oil refinery is in the gulf coast region of the U.S., the midwest region of the U.S., the California region of the U.S., or northwest Europe. Systems and processes of the present invention that comprise butanol fuel blends are more economical than systems and processes that do not comprise alcohol fuel blends or than systems and processes that comprise ethanol fuel blends, for example, because systems and processes that comprise butanol fuel blends allow greater amounts of light naphtha and/or butane to be used in fuels made by the refinery, realizing a higher price, than being sold outright as refinery by products, realizing a lower price.

In some embodiments, the light naphtha utilization is increased by at least about 1%, at least about 2%, at least about 3%, at least about 4%, at least about 5%, at least about 6%, at least about 7%, at least 8%, at least about 9%, at least about 10%, at least about 11%, at least about 12%, at least about 13%, at least about 14%, at least about 15%, at least about 16%, at least about 17%, at least about 18%, at least about 19%, at least about 20%, at least about 21%, at least about 22%, at least about 23%, at least about 24%, at least about 25%, at least about 26%, at least about 27%, at least about 28%, at least about 29%, or at least about 30%. In some embodiments, the light naphtha utilization is increased by any range of values described herein, for example, from about 1% to about 30%, from about 2% to about 30%, from about 3% to about 30%, from about 5% to about 30%, from about 10% to about 30%, from about 20% to about 30%, from about 1% to about 25%, from about 2% to about 25%, from about 3% to about 25%, from about 5% to about 25%, from about 10% to about 25%, from about 1% to about 20%, from about 2% to about 20%, from about 3% to about 20%, from about 5% to about 20%, from about 10% to about 20%, from about 1% to about 15%, from about 2% to about 15%, from about 3% to about 15%, from about 5% to about 15%, from about 10% to about 15%, or from about 3% to about 13%.

In some embodiments, the butane utilization is increased by at least about 1%, at least about 2%, at least about 3%, at least about 4%, at least about 5%, at least about 6%, at least about 7%, at least 8%, at least about 9%, at least about 10%, at least about 11%, at least about 12%, at least about 13%, at least about 14%, at least about 15%, at least about 16%, at least about 17%, at least about 18%, at least about 19%, at least about 20%, at least about 21%, at least about 22%, at least about 23%, at least about 24%, at least about 25%, at least about 26%, at least about 27%, at least about 28%, at least about 29%, or at least about 30%.

In some embodiments, the butane utilization is increased by any range of values described herein, for example, from about 1% to about 30%, from about 2% to about 30%, from about 3% to about 30%, from about 5% to about 30%, from about 10% to about 30%, from about 20% to about 30%, from about 1% to about 25%, from about 2% to about 25%, from about 3% to about 25%, from about 5% to about 25%, from about 10% to about 25%, from about 1% to about 20%, from about 2% to about 20%, from about 3% to about 20%, from about 5% to about 20%, from about 10% to about 20%, from about 1% to about 15%, from about 2% to about 15%, from about 3% to about 15%, from about 5% to about 15%, from about 10% to about 15%, or from about 3% to about 13%.

In some embodiments, the invention is directed to a method for producing a butanol blended gasoline, comprising (a) operating an oil refinery to produce a light distillate product from crude oil, wherein the oil refinery comprises at least one octane upgrading unit; (b) feeding a naphtha feedstock to the octane upgrading unit to convert the naphtha feedstock to an upgraded naphtha product having a higher octane than an octane of the naphtha feedstock, wherein the light distillate product includes the upgraded naphtha product; and (c) blending the light distillate product with an amount of butanol to produce a butanol blended gasoline, and wherein the amount of upgraded naphtha product in the butanol blended gasoline is any amount disclosed herein, for example, from about 10% to about 50% by volume of the gasoline, from about 10% to about 45% by volume of the gasoline, from about 15% to about 45% by volume of the gasoline, from about 20% to about 45% by volume of the gasoline, from about 25% to about 45% by volume of the gasoline, from about 30% to about 45% by volume of the gasoline, or from about 30% to about 43% by volume of the gasoline.

In some embodiments, the invention is directed to a method for producing a butanol blended gasoline, comprising (a) operating an oil refinery to produce a light distillate product from crude oil; (b) operating the refinery to produce an upgraded naphtha product, wherein the light distillate product comprises the upgraded naphtha product; and (c) forming a blend of at least the light distillate product and an amount of butanol to produce a butanol blended gasoline, wherein the amount of upgraded naphtha product in the butanol blended gasoline is any amount disclosed herein, for example, from about 10% to about 50% by volume of the gasoline, from about 10% to about 45% by volume of the gasoline, from about 15% to about 45% by volume of the gasoline, from about 20% to about 45% by volume of the gasoline, from about 25% to about 45% by volume of the gasoline, from about 30% to about 45% by volume of the gasoline, or from about 30% to about 43% by volume of the gasoline.

In some embodiments, the systems and processes of the present invention include producing a blended gasoline. In some embodiments, the systems and processes include (a) operating an oil refinery to produce a gasoline; and (b) blending the gasoline with an amount of butanol to produce a butanol blended gasoline. In some embodiments, the process includes transporting the butanol blended gasoline from the oil refinery to a retail bulk terminal station. In some embodiments, the butanol blended gasoline is transported by pipeline or marine vessel.

In some embodiments, the systems and processes of the present invention include producing a distillate product from an oil refinery. In some embodiments, the processes include (a) operating an oil refinery to produce a light distillate product from crude oil, wherein the oil refinery comprises at least one octane upgrading unit; (b) feeding a naphtha feedstock to the octane upgrading unit to convert the naphtha feedstock to an upgraded naphtha product having a higher octane than an octane of the naphtha feedstock, wherein the light distillate product includes the upgraded naphtha product; and (c) blending the light distillate product with an amount of butanol to produce a butanol blended gasoline.

In some embodiments, a throughput for the octane upgrading unit is less than a throughput for the octane upgrading unit when the oil refinery is operated to produce a different light distillate product which is an automotive-grade gasoline free of alcohol or which is for blending with an amount of ethanol to produce an automotive-grade blended gasoline. In some embodiments, the light distillate product comprises gasoline. In some embodiments, the butanol comprises isobutanol.

In some embodiments, the throughput for the octane upgrading unit is about 1% or less, about 5% or less, about 10% or less, about 11% or less, about 12% or less, about 13% or less, about 14% or less, about 15% or less, about 16% or less, about 17% or less, about 18% or less, about 19% or less, about 20% or less, about 21% or less, about 22% or less, about 23% or less, about 24% or less, about 25% or less, about 26% or less, about 27% or less, about 28% or less, about 29% or less, about 30% or less, about 31% or less, about 32% or less, about 33% or less, about 34% or less, about 35% or less, about 36% or less, about 37% or less, about 38% or less, about 39% or less, about 40% or less, about 41% or less, about 42% or less, about 43% or less, about 44% or less, about 45% or less, about 46% or less, about 47% or less, about 48% or less, about 49% or less, about 50% or less, about 55% or less, or about 60% or less than the throughput for the octane upgrading unit when the oil refinery is operated to produce a different light distillate product which is an automotive-grade gasoline free of alcohol. In some embodiments, the throughput for the octane upgrading unit is any range of values described herein, for example, from about 1% to about 60% less, about 5% to about 60% less, from about 10% to about 60% less, from about 15% to about 60% less, from about 1% to about 55% less, from about 5% to about 55% less, from about 10% to about 55% less, from 15% to about 55% less, from about 1% to about 50% less, from about 5% to about 50% less, from about 10% to about 50% less, from about 15% to about 50% less, from about 1% to about 45% less, from about 5% to about 45% less, from about 10% to about 45% less, from about 15% to about 45% less, from about 1% to about 40% less, from about 5% to about 40% less, from about 10% to about 40% less, from about 15% to about 40% less, or from about 18% to about 41% less than the throughput for the octane upgrading unit when the oil refinery is operated to produce a different light distillate product which is an automotive-grade gasoline free of alcohol. In some embodiments, the resulting gasoline blend of such systems or processes is summer grade or summer grade equivalent. In some embodiments, the resulting gasoline blend of such systems or processes is winter grade or winter grade equivalent. In some embodiments, the resulting gasoline blend of such systems or processes is a conventional gasoline, RFG, CARB, or equivalent thereof. In some embodiments, the resulting gasoline blend of such systems or processes is Euro-5 gasoline or equivalent thereof. In some embodiments, the oil refinery of such systems or processes is in the gulf coast region of the U.S., the midwest region of the U.S., the California region of the U.S., or northwest Europe.

In some embodiments, the throughput for the octane upgrading unit is about 1% or less, about 5% or less, about 10% or less, about 11% or less, about 12% or less, about 13% or less, about 14% or less, about 15% or less, about 16% or less, about 17% or less, about 18% or less, about 19% or less, about 20% or less, about 21% or less, about 22% or less, about 23% or less, about 24% or less, about 25% or less, about 26% or less, about 27% or less, about 28% or less, about 29% or less, about 30% or less, about 31% or less, about 32% or less, about 33% or less, about 34% or less, about 35% or less, about 36% or less, about 37% or less, about 38% or less, about 39% or less, about 40% or less, about 41% or less, about 42% or less, about 43% or less, about 44% or less, about 45% or less, about 46% or less, about 47% or less, about 48% or less, about 49% or less, about 50% or less, about 55% or less, or about 60% or less than the throughput for the octane upgrading unit when the oil refinery is operated to produce a different light distillate product which is for blending with an amount of ethanol to produce an automotive-grade gasoline. In some embodiments, the throughput for the octane upgrading unit is any range of values described herein, for example, from about 1% to about 60% less, about 5% to about 60% less, from about 10% to about 60% less, from about 15% to about 60% less, from about 1% to about 55% less, from about 5% to about 55% less, from about 10% to about 55% less, from 15% to about 55% less, from about 1% to about 50% less, from about 5% to about 50% less, from about 10% to about 50% less, from about 15% to about 50% less, from about 1% to about 45% less, from about 5% to about 45% less, from about 10% to about 45% less, from about 15% to about 45% less, from about 1% to about 40% less, from about 5% to about 40% less, from about 10% to about 40% less, from about 15% to about 40% less, or from about 18% to about 41% less than the throughput for the octane upgrading unit when the oil refinery is operated to produce a different light distillate product which is for blending with an amount of ethanol to produce an automotive-grade gasoline. In some embodiments, the resulting gasoline blend of such systems or processes is summer grade or summer grade equivalent. In some embodiments, the resulting gasoline blend of such systems or processes is winter grade or winter grade equivalent. In some embodiments, the resulting gasoline blend of such systems or processes is a conventional gasoline, RFG, CARB, or equivalent thereof. In some embodiments, the resulting gasoline blend of such systems or processes is Euro-5 gasoline or equivalent thereof. In some embodiments, the oil refinery of such systems or processes is in the gulf coast region of the U.S., the midwest region of the U.S., the California region of the U.S., or northwest Europe.

In some embodiments, the throughput for the catalytic reformer unit is about 1% or less, about 5% or less, about 10% or less, about 11% or less, about 12% or less, about 13% or less, about 14% or less, about 15% or less, about 16% or less, about 17% or less, about 18% or less, about 19% or less, about 20% or less, about 21% or less, about 22% or less, about 23% or less, about 24% or less, about 25% or less, about 26% or less, about 27% or less, about 28% or less, about 29% or less, about 30% or less, about 31% or less, about 32% or less, about 33% or less, about 34% or less, about 35% or less, about 36% or less, about 37% or less, about 38% or less, about 39% or less, about 40% or less, about 41% or less, about 42% or less, about 43% or less, about 44% or less, about 45% or less, about 46% or less, about 47% or less, about 48% or less, about 49% or less, about 50% or less, about 55% or less, or about 60% or less than the throughput for the catalytic reformer unit when the oil refinery is operated to produce a different light distillate product which is an automotive-grade gasoline free of alcohol. In some embodiments, the throughput for the catalytic reformer unit is any range of values described herein, for example, from about 1% to about 60% less, about 5% to about 60% less, from about 10% to about 60% less, from about 15% to about 60% less, from about 1% to about 55% less, from about 5% to about 55% less, from about 10% to about 55% less, from 15% to about 55% less, from about 1% to about 50% less, from about 5% to about 50% less, from about 10% to about 50% less, from about 15% to about 50% less, from about 1% to about 45% less, from about 5% to about 45% less, from about 10% to about 45% less, from about 15% to about 45% less, from about 1% to about 40% less, from about 5% to about 40% less, from about 10% to about 40% less, from about 15% to about 40% less, or from about 18% to about 41% less than the throughput for the catalytic reformer unit when the oil refinery is operated to produce a different light distillate product which is for blending with an amount of ethanol to produce an automotive-grade gasoline. In some embodiments, the resulting gasoline blend of such systems or processes is summer grade or summer grade equivalent. In some embodiments, the resulting gasoline blend of such systems or processes is winter grade or winter grade equivalent. In some embodiments, the resulting gasoline blend of such systems or processes is a conventional gasoline, RFG, CARB, or equivalent thereof. In some embodiments, the resulting gasoline blend of such systems or processes is Euro-5 gasoline or equivalent thereof. In some embodiments, the oil refinery of such systems or processes is in the gulf coast region of the U.S., the midwest region of the U.S., the California region of the U.S., or northwest Europe.

In some embodiments, the throughput for the catalytic reformer unit is about 1% or less, about 5% or less, about 10% or less, about 11% or less, about 12% or less, about 13% or less, about 14% or less, about 15% or less, about 16% or less, about 17% or less, about 18% or less, about 19% or less, about 20% or less, about 21% or less, about 22% or less, about 23% or less, about 24% or less, about 25% or less, about 26% or less, about 27% or less, about 28% or less, about 29% or less, about 30% or less, about 31% or less, about 32% or less, about 33% or less, about 34% or less, about 35% or less, about 36% or less, about 37% or less, about 38% or less, about 39% or less, about 40% or less, about 41% or less, about 42% or less, about 43% or less, about 44% or less, about 45% or less, about 46% or less, about 47% or less, about 48% or less, about 49% or less, about 50% or less, about 55% or less, or about 60% or less than the throughput for the catalytic reformer unit when the oil refinery is operated to produce a different light distillate product which is for blending with an amount of ethanol to produce an automotive-grade gasoline. In some embodiments, the throughput for the catalytic reformer unit is any range of values described herein, for example, from about 1% to about 60% less, about 5% to about 60% less, from about 10% to about 60% less, from about 15% to about 60% less, from about 1% to about 55% less, from about 5% to about 55% less, from about 10% to about 55% less, from 15% to about 55% less, from about 1% to about 50% less, from about 5% to about 50% less, from about 10% to about 50% less, from about 15% to about 50% less, from about 1% to about 45% less, from about 5% to about 45% less, from about 10% to about 45% less, from about 15% to about 45% less, from about 1% to about 40% less, from about 5% to about 40% less, from about 10% to about 40% less, from about 15% to about 40% less, or from about 18% to about 41% less than the throughput for the catalytic reformer unit when the oil refinery is operated to produce a different light distillate product which is for blending with an amount of ethanol to produce an automotive-grade gasoline. In some embodiments, the resulting gasoline blend of such systems or processes is summer grade or summer grade equivalent. In some embodiments, the resulting gasoline blend of such systems or processes is winter grade or winter grade equivalent. In some embodiments, the resulting gasoline blend of such systems or processes is a conventional gasoline, RFG, CARB, or equivalent thereof. In some embodiments, the resulting gasoline blend of such systems or processes is Euro-5 gasoline or equivalent thereof. In some embodiments, the oil refinery of such systems or processes is in the gulf coast region of the U.S., the midwest region of the U.S., the California region of the U.S., or northwest Europe.

In some embodiments, the throughput for the isomerization unit is at least about 1% less, at least about 5% less, at least about 6% less, at least about 7% less, at least about 8% less, at least about 9% less, at least about 10% less, at least about 15% less, at least about 16% less, at least about 17% less, at least about 18% less, at least about 19% less, at least about 20% less, at least about 25% less, at least about 30% less, at least about 35% less, at least about 40% less, at least about 45% less, at least about 50% less, at least about 55% less, at least about 60% less, at least about 65% less, at least about 70% less, at least about 75% less, at least about 80% less, at least about 85% less, at least about 90% less, at least about 95% less, or at least about 99% less than the throughput for the isomerization unit when the oil refinery is operated to produce a different light distillate product which is an automotive-grade gasoline free of alcohol. In some embodiments, the throughput for the isomerization unit is any range of values described herein, for example, from about 1% to about 99% less, about 5% to about 99% less, from about 1% to about 95% less, from about 5% to about 95% less, from about 10% to about 95% less, from about 15% to about 95% less, from about 1% to about 90% less, from about 5% to about 90% less, from about 10% to about 90% less, from about 15% to about 90% less, or from about 9% to about 92% less than the throughput for the isomerization unit when the oil refinery is operated to produce a different light distillate product which is an automotive-grade gasoline free of alcohol. In some embodiments, the resulting gasoline blend of such systems or processes is summer grade or summer grade equivalent. In some embodiments, the resulting gasoline blend of such systems or processes is winter grade or winter grade equivalent. In some embodiments, the resulting gasoline blend of such systems or processes is a conventional gasoline, RFG, CARB, or equivalent thereof. In some embodiments, the resulting gasoline blend of such systems or processes is Euro-5 gasoline or equivalent thereof. In some embodiments, the oil refinery of such systems or processes is in the gulf coast region of the U.S., the midwest region of the U.S., the California region of the U.S., or northwest Europe.

In some embodiments, the throughput for the isomerization unit is at least about 1% less, at least about 5% less, at least about 6% less, at least about 7% less, at least about 8% less, at least about 9% less, at least about 10% less, at least about 15% less, at least about 16% less, at least about 17% less, at least about 18% less, at least about 19% less, at least about 20% less, at least about 25% less, at least about 30% less, at least about 35% less, at least about 40% less, at least about 45% less, at least about 50% less, at least about 55% less, at least about 60% less, at least about 65% less, at least about 70% less, at least about 75% less, at least about 80% less, at least about 85% less, at least about 90% less, at least about 95% less, or at least about 99% less than the throughput for the isomerization unit when the oil refinery is operated to produce a different light distillate product which is for blending with an amount of ethanol to produce an automotive-grade gasoline. In some embodiments, the throughput for the isomerization unit is any range of values described herein, for example, from about 1% to about 99% less, about 5% to about 99% less, from about 1% to about 95% less, from about 5% to about 95% less, from about 10% to about 95% less, from about 15% to about 95% less, from about 1% to about 90% less, from about 5% to about 90% less, from about 10% to about 90% less, from about 15% to about 90% less, or from about 9% to about 92% less than the throughput for the isomerization unit when the oil refinery is operated to produce a different light distillate product which is for blending with an amount of ethanol to produce an automotive-grade gasoline. In some embodiments, the resulting gasoline blend of such systems or processes is summer grade or summer grade equivalent. In some embodiments, the resulting gasoline blend of such systems or processes is winter grade or winter grade equivalent. In some embodiments, the resulting gasoline blend of such systems or processes is a conventional gasoline, RFG, CARB, or equivalent thereof. In some embodiments, the resulting gasoline blend of such systems or processes is Euro-5 gasoline or equivalent thereof. In some embodiments, the oil refinery of such systems or processes is in the gulf coast region of the U.S., the midwest region of the U.S., the California region of the U.S., or northwest Europe.

In some embodiments, the throughput for the benzene saturation unit is at least about 1% less, at least about 5% less, at least about 6% less, at least about 7% less, at least about 8% less, at least about 9% less, at least about 10% less, at least about 15% less, at least about 16% less, at least about 17% less, at least about 18% less, at least about 19% less, at least about 20% less, at least about 25% less, at least about 30% less, at least about 35% less, at least about 40% less, at least about 45% less, at least about 50% less, at least about 55% less, at least about 60% less, at least about 65% less, at least about 70% less, at least about 75% less, at least about 80% less, at least about 85% less, at least about 90% less, at least about 95% less, or at least about 99% less than the throughput for the benzene saturation unit when the oil refinery is operated to produce a different light distillate product which is an automotive-grade gasoline free of alcohol. In some embodiments, the throughput for the benzene saturation unit is any range of values described herein, for example, from about 1% to about 99% less, about 5% to about 99% less, from about 1% to about 95% less, from about 5% to about 95% less, from about 10% to about 95% less, from about 15% to about 95% less, from about 20% to about 95%, from about 25% to about 95%, from about 1% to about 90% less, from about 5% to about 90% less, from about 10% to about 90% less, from about 15% to about 90% less, or from about 21% to about 93% less than the throughput for the benzene saturation unit when the oil refinery is operated to produce a different light distillate product which is an automotive-grade gasoline free of alcohol. In some embodiments, the resulting gasoline blend of such systems or processes is summer grade or summer grade equivalent. In some embodiments, the resulting gasoline blend of such systems or processes is winter grade or winter grade equivalent. In some embodiments, the resulting gasoline blend of such systems or processes is a conventional gasoline, RFG, CARB, or equivalent thereof. In some embodiments, the resulting gasoline blend of such systems or processes is Euro-5 gasoline or equivalent thereof. In some embodiments, the oil refinery of such systems or processes is in the gulf coast region of the U.S., the midwest region of the U.S., the California region of the U.S., or northwest Europe.

In some embodiments, the throughput for the benzene saturation unit is at least about 1% less, at least about 5% less, at least about 6% less, at least about 7% less, at least about 8% less, at least about 9% less, at least about 10% less, at least about 15% less, at least about 16% less, at least about 17% less, at least about 18% less, at least about 19% less, at least about 20% less, at least about 25% less, at least about 30% less, at least about 35% less, at least about 40% less, at least about 45% less, at least about 50% less, at least about 55% less, at least about 60% less, at least about 65% less, at least about 70% less, at least about 75% less, at least about 80% less, at least about 85% less, at least about 90% less, at least about 95% less, or at least about 99% less than the throughput for the benzene saturation unit when the oil refinery is operated to produce a different light distillate product which is for blending with an amount of ethanol to produce an automotive-grade gasoline. In some embodiments, the throughput for the benzene saturation unit is any range of values described herein, for example, from about 1% to about 99% less, about 5% to about 99% less, from about 10% to about 99% less, from about 1% to about 95% less, about 5% to about 95% less, from about 10% to about 95% less, from about 1% to about 90% less, about 5% to about 90% less, from about 10% to about 90% less, from about 1% to about 85% less, about 5% to about 85% less, from about 10% to about 85% less, from about 1% to about 80% less, about 5% to about 80% less, from about 10% to about 80% less, from about 1% to about 75% less, about 5% to about 75% less, from about 10% to about 75% less, from about 1% to about 70% less, about 5% to about 70% less, from about 10% to about 70% less, from about 1% to about 65% less, about 5% to about 65% less, from about 10% to about 65% less, from about 1% to about 60% less, about 5% to about 60% less, from about 10% to about 60% less, from about 1% to about 55% less, about 5% to about 55% less, from about 10% to about 55% less, from about 1% to about 50% less, about 5% to about 50% less, from about 10% to about 50% less, from about 1% to about 45% less, about 5% to about 45% less, from about 10% to about 45% less, from about 1% to about 40% less, about 5% to about 40% less, from about 10% to about 40% less, from about 1% to about 35% less, about 5% to about 35% less, from about 10% to about 35% less, or from about 7% to about 35% than the throughput for the benzene saturation unit when the oil refinery is operated to produce a different light distillate product which is for blending with an amount of ethanol to produce an automotive-grade gasoline. In some embodiments, the resulting gasoline blend of such systems or processes is summer grade or summer grade equivalent. In some embodiments, the resulting gasoline blend of such systems or processes is winter grade or winter grade equivalent. In some embodiments, the resulting gasoline blend of such systems or processes is a conventional gasoline, RFG, CARB, or equivalent thereof. In some embodiments, the resulting gasoline blend of such systems or processes is Euro-5 gasoline or equivalent thereof. In some embodiments, the oil refinery of such systems or processes is in the gulf coast region of the U.S., the midwest region of the U.S., the California region of the U.S., or northwest Europe.

In some embodiments, the systems and processes of the present invention form a butanol blended fuel comprising an upgraded naphtha product. In some embodiments, the fuel is gasoline. In some embodiments, the butanol comprises isobutanol. In some embodiments, the upgraded naphtha product is the throughput product of an isomerization unit. In some embodiments, the upgraded naphtha product is the throughput product of a catalytic reformer unit. In some embodiments, the upgraded naphtha product is at least about 1%, at least about 5%, at least about 10%, at least about 15%, at least about 20%, at least about 25%, at least about 30%, at least about 35%, at least about 40%, at least about 45%, at least about 50%, at least about 55% or at least about 60% by volume of the fuel. In some embodiments, the upgraded naphtha product is any range of values described herein, for example, from about 1% to about 60%, from about 5% to about 60%, from about 10% to about 60%, from about 15% to about 60%, from about 20% to about 60%, from about 25% to about 60%, from about 30% to about 60%, from about 1% to about 50%, from about 5% to about 50%, from about 10% to about 50%, from about 15% to about 50%, from about 20% to about 50%, from about 25% to about 50%, from about 30% to about 50%, from about 1% to about 45%, from about 5% to about 45%, from about 10% to about 45%, from about 15% to about 45%, from about 20% to about 45%, from about 25% to about 45%, from about 30% to about 45%, or from about 30% to about 43% by volume of the fuel. In some embodiments, the resulting gasoline blend of such systems or processes is summer grade or summer grade equivalent. In some embodiments, the resulting fuel blend of such systems or processes is winter grade or winter grade equivalent. In some embodiments, the resulting fuel blend of such systems or processes is a conventional gasoline, RFG, CARB, or equivalent thereof. In some embodiments, the resulting fuel blend of such systems or processes is Euro-5 gasoline or equivalent thereof. In some embodiments, the oil refinery of such systems or processes is in the gulf coast region of the U.S., the midwest region of the U.S., the California region of the U.S., or northwest Europe.

In other embodiments, the systems and processes include (a) operating an oil refinery to produce a light distillate product from crude oil, wherein the oil refinery comprises at least one hydrotreater unit, (b) feeding a feedstock to the hydrotreater unit, the feedstock being derived from the crude oil; (c) treating the feedstock in the hydrotreater unit to reduce a sulfur content of the feedstock to produce a hydrotreated product, wherein the light distillate product includes the hydrotreated product; and (d) blending the light distillate product with an amount of butanol to produce a butanol blended gasoline. In some embodiments, a throughput for the hydrotreater is less than a throughput for the hydrotreater when the oil refinery is operated to produce a different light distillate product. In some embodiments, the different light distillate product is an automotive-grade gasoline free of alcohol or which is for blending with an amount of ethanol to produce an automotive-grade blended gasoline.

In some embodiments, the oil refinery further comprises at least one octane upgrading unit. In some embodiments, the systems and processes further include feeding the hydrotreated product to the octane upgrading unit to convert the hydrotreated product to an upgraded product having a higher octane than an octane of the hydrotreated product, the light distillate product thereby including the upgraded product. In some embodiments, a throughput for the octane upgrading unit is less than a throughput for the octane upgrading unit when the oil refinery is operated to produce a different light distillate product which is an automotive-grade gasoline free of alcohol or which is for blending with an amount of ethanol to produce an automotive-grade blended gasoline.

In some embodiments, the systems and processes of the present invention have reduced capacity of a hydrotreater unit of an oil refinery compared to systems and processes of an oil refinery that does not generate alcohol fuel blends and/or that generates ethanol fuel blends. In some embodiments, the reduced capacity is at least about 1%, at least about 5%, at least about 10%, at least about 15%, at least about 20%, at least about 30%, at least about 35%, at least about 40%, at least about 45%, at least about 50%, at least about 55%, at least about 60%, at least about 65%, about 70% or less, about 75% or less, about 80% or less, about 85% or less, about 90% or less, about 95% or less, about 97% or less, about 98% or less, or about 99% or less compared to systems and processes of an oil refinery that does not generate alcohol fuel blends and/or that generates ethanol fuel blends. In some embodiments, the reduced capacity can be any range of values described herein, for example, from about 1% to about 98%, from about 5% to about 98%, from about 10% to about 98%, from about 1% to about 97%, from about 5% to about 97%, from about 10% to about 97%, from about 1% to about 95%, from about 5% to about 95%, from about 10% to about 95%, from about 1% to about 90%, from about 5% to about 90%, from about 10% to about 90%, from about 1% to about 80%, from about 5% to about 80%, from about 10% to about 80%, from about 1% to about 70%, from about 5% to about 70%, from about 10% to about 70%, from about 1% to about 60%, from about 5% to about 60%, from about 10% to about 60%, from about 1% to about 50%, from about 5% to about 50%, from about 10% to about 50%, or from about 15% to about 97% compared to systems and processes of an oil refinery that does not generate alcohol fuel blends and/or that generates ethanol fuel blends. In some embodiments, the resulting gasoline blend of such systems or processes is summer grade or summer grade equivalent. In some embodiments, the resulting fuel blend of such systems or processes is winter grade or winter grade equivalent. In some embodiments, the resulting fuel blend of such systems or processes is a conventional gasoline, RFG, CARB, or equivalent thereof. In some embodiments, the resulting fuel blend of such systems or processes is Euro-5 gasoline or equivalent thereof. In some embodiments, the oil refinery of such systems or processes is in the gulf coast region of the U.S., the midwest region of the U.S., the California region of the U.S., or northwest Europe.

In some embodiments, the systems and processes of the present invention include blending one or more alcohols with a fuel. In some embodiments, the alcohol is ethanol, butanol or mixtures thereof. In some embodiments, the alcohol is ethanol. In some embodiments, the alcohol is butanol. In some embodiments, the butanol is n-butanol, 2-butanol, isobutanol, tert-butyl alcohol, or a mixture thereof. In some embodiments, the butanol comprises isobutanol. In some embodiments, the butanol is isobutanol.

In some embodiments, the fuel is a biofuel, gasoline, gasoline subgrade (e.g., blendstocks for oxygenate blending), diesel, jet fuel, or a mixture thereof. In some embodiments, the fuel is a biofuel. In some embodiments, the fuel is gasoline or gasoline subgrade. In some embodiments, the gasoline is a an automotive-grade gasoline, unleaded gasoline, conventional gasoline, oxygenated gasoline, reformulated gasoline, biogasoline (i.e., gasoline which in some way is derived from biomass), Fischer-Tropsch gasoline, or a mixture thereof. In some embodiments, the fuel is diesel. In some embodiments, the fuel is jet fuel. In some embodiments, the gasoline meets ASTM standards.

In some embodiments, the systems and processes of the present invention include blending one or more alcohols with a fuel. In some embodiments, one or more alcohols is blended with a light distillate product. In some embodiments, the blending is at or in close proximity to the oil refinery. In some embodiments, the blending is at the oil refinery.

In some embodiments, the amount of alcohol that is blended with the fuel is at least about 10 vol % of the alcohol blended fuel. In some embodiments, the fuel blend comprises an alcohol at a concentration of at least about 0.01 vol %, about 0.1 vol %, about 0.2 vol %, about 0.3 vol %, about 0.4 vol %, about 0.5 vol %, about 0.6 vol %, about 0.7 vol %, about 0.8 vol %, about 0.9 vol %, about 1.0 vol %, about 1.5 vol %, about 2 vol %, about 2.5 vol %, about 3 vol %, about 3.5 vol %, about 4 vol %, about 4.5 vol %, about 5 vol %, about 5.5 vol %, about 6 vol %, about 6.5 vol %, about 7 vol %, about 7.5 vol %, about 8 vol %, about 8.5 vol %, about 9 vol %, about 9.5 vol %, about 10 vol %, about 11 vol %, about 12 vol %, about 13 vol %, about 14 vol %, about 15 vol %, about 16 vol %, about 17 vol %, about 18 vol %, about 19 vol %, about 20 vol %, about 21 vol %, about 22 vol %, about 23 vol %, about 24 vol %, about 25 vol %, about 26 vol %, about 27 vol %, about 28 vol %, about 29 vol %, about 30 vol %, about 35 vol %, about 40 vol %, about 45 vol %, about 50 vol %, about 55 vol %, about 60 vol %, about 65 vol %, about 70 vol %, about 75 vol %, about 80 vol %, about 85 vol %, about 90 vol %, about 95 vol %, or about 99 vol % based on the total volume of the fuel blend, and useful ranges can be selected between any of these values (for example, about 0.01 vol % to about 99 vol %, about 0.01 vol % to about 1 vol %, about 0.1 vol % to about 10 vol %, about 0.5 vol % to about 10 vol %, about 1 vol % to about 5 vol %, about 5 vol % to about 25 vol %, about 5 vol % to about 95 vol %, about 5 vol % to about 80 vol %, about 10 vol % to about 95 vol %, about 15 vol % to about 95 vol %, about 20 vol % to about 95 vol %, about 10 vol % to about 24 vol %, about 16 vol % to about 24 vol %, about 25 vol % to about 95 vol %, about 30 vol % to about 95 vol %, about 35 vol % to about 95 vol %, about 40 vol % to about 95 vol %, about 45 vol % to about 95 vol %, about 50 vol % to about 95 vol %, about 1 vol % to about 99 vol %, about 5 vol % to about 99 vol %, about 10 vol % to about 99 vol %, about 15 vol % to about 99 vol %, about 20 vol % to about 99 vol %, about 25 vol % to about 99 vol %, about 30 vol % to about 99 vol %, about 35 vol % to about 99 vol %, about 40 vol % to about 99 vol %, about 45 vol % to about 99 vol %, about 50 vol % to about 99 vol %, about 5 vol % to about 70 vol %, about 10 vol % to about 70 vol %, about 15 vol % to about 70 vol %, about 20 vol % to about 70 vol %, about 25 vol % to about 70 vol %, about 30 vol % to about 70 vol %, about 35 vol % to about 70 vol %, about 40 vol % to about 70 vol %, about 45 vol % to about 70 vol %, and about 50 vol % to about 70 vol %, about 60 vol % to about 90 vol % based on the total volume of the composition).

In some embodiments, the fuel blend comprises a gasoline and/or gasoline subgrade at a concentration of at least about 0.01 vol %, about 0.1 vol %, about 0.2 vol %, about 0.3 vol %, about 0.4 vol %, about 0.5 vol %, about 0.6 vol %, about 0.7 vol %, about 0.8 vol %, about 0.9 vol %, about 1.0 vol %, about 1.5 vol %, about 2 vol %, about 2.5 vol %, about 3 vol %, about 3.5 vol %, about 4 vol %, about 4.5 vol %, about 5 vol %, about 5.5 vol %, about 6 vol %, about 6.5 vol %, about 7 vol %, about 7.5 vol %, about 8 vol %, about 8.5 vol %, about 9 vol %, about 9.5 vol %, about 10 vol %, about 11 vol %, about 12 vol %, about 13 vol %, about 14 vol %, about 15 vol %, about 16 vol %, about 17 vol %, about 18 vol %, about 19 vol %, about 20 vol %, about 21 vol %, about 22 vol %, about 23 vol %, about 24 vol %, about 25 vol %, about 26 vol %, about 27 vol %, about 28 vol %, about 29 vol %, about 30 vol %, about 35 vol %, about 40 vol %, about 45 vol %, about 50 vol %, about 55 vol %, about 60 vol %, about 65 vol %, about 70 vol %, about 75 vol %, about 80 vol %, about 85 vol %, about 90 vol %, about 95 vol %, or about 99 vol % based on the total volume of the fuel blend, and useful ranges can be selected between any of these values (for example, about 0.01 vol % to about 99 vol %, about 0.01 vol % to about 1 vol %, about 0.1 vol % to about 10 vol %, about 0.5 vol % to about 10 vol %, about 1 vol % to about 5 vol %, about 5 vol % to about 25 vol %, about 5 vol % to about 95 vol %, about 5 vol % to about 80 vol %, about 10 vol % to about 95 vol %, about 15 vol % to about 95 vol %, about 20 vol % to about 95 vol %, about 10 vol % to about 24 vol %, about 16 vol % to about 24 vol %, about 25 vol % to about 95 vol %, about 30 vol % to about 95 vol %, about 35 vol % to about 95 vol %, about 40 vol % to about 95 vol %, about 45 vol % to about 95 vol %, about 50 vol % to about 95 vol %, about 1 vol % to about 99 vol %, about 5 vol % to about 99 vol %, about 10 vol % to about 99 vol %, about 15 vol % to about 99 vol %, about 20 vol % to about 99 vol %, about 25 vol % to about 99 vol %, about 30 vol % to about 99 vol %, about 35 vol % to about 99 vol %, about 40 vol % to about 99 vol %, about 45 vol % to about 99 vol %, about 50 vol % to about 99 vol %, about 5 vol % to about 70 vol %, about 10 vol % to about 70 vol %, about 15 vol % to about 70 vol %, about 20 vol % to about 70 vol %, about 25 vol % to about 70 vol %, about 30 vol % to about 70 vol %, about 35 vol % to about 70 vol %, about 40 vol % to about 70 vol %, about 45 vol % to about 70 vol %, and about 50 vol % to about 70 vol %, about 60 vol % to about 90 vol % based on the total volume of the composition).

In other embodiments, the amount of butanol that is blended with the light distillate product is at least about 10 vol % of the butanol blended gasoline. In some embodiments, the amount of butanol that is blended with the light distillate product is from about 10 vol % to about 16 vol % of the butanol blended gasoline. In some embodiments, the amount of butanol that is blended with the light distillate product is from about 16 vol % to about 24 vol % of the butanol blended gasoline. In some embodiments, the oil refinery is operated to produce the different light distillate product for blending with ethanol, the amount of ethanol being blended with the light distillate product is not more than about 10 vol % of the automotive-grade blended gasoline.

In some embodiments, the fuel blend has one or more performance parameter that complies with the minimum performance parameters of ASTM D-4814. In some embodiments, the fuel blend has one or more performance parameters substantially the same as a fuel blend having 10 vol % ethanol. In some embodiments, the fuel blend has one or more improved performance parameters compared to a fuel blend having 10 vol % ethanol.

Many fuel blends suitable for combustion in automotive spark-ignition engines conform to the requirements of ASTM D-4814 specifications, which specifications are herein incorporated by reference in their entirety. It should be understood that depending on a particular alcohol and fuel to be blended, the amount of alcohol and fuel can vary, as described further herein.

Figure 2:
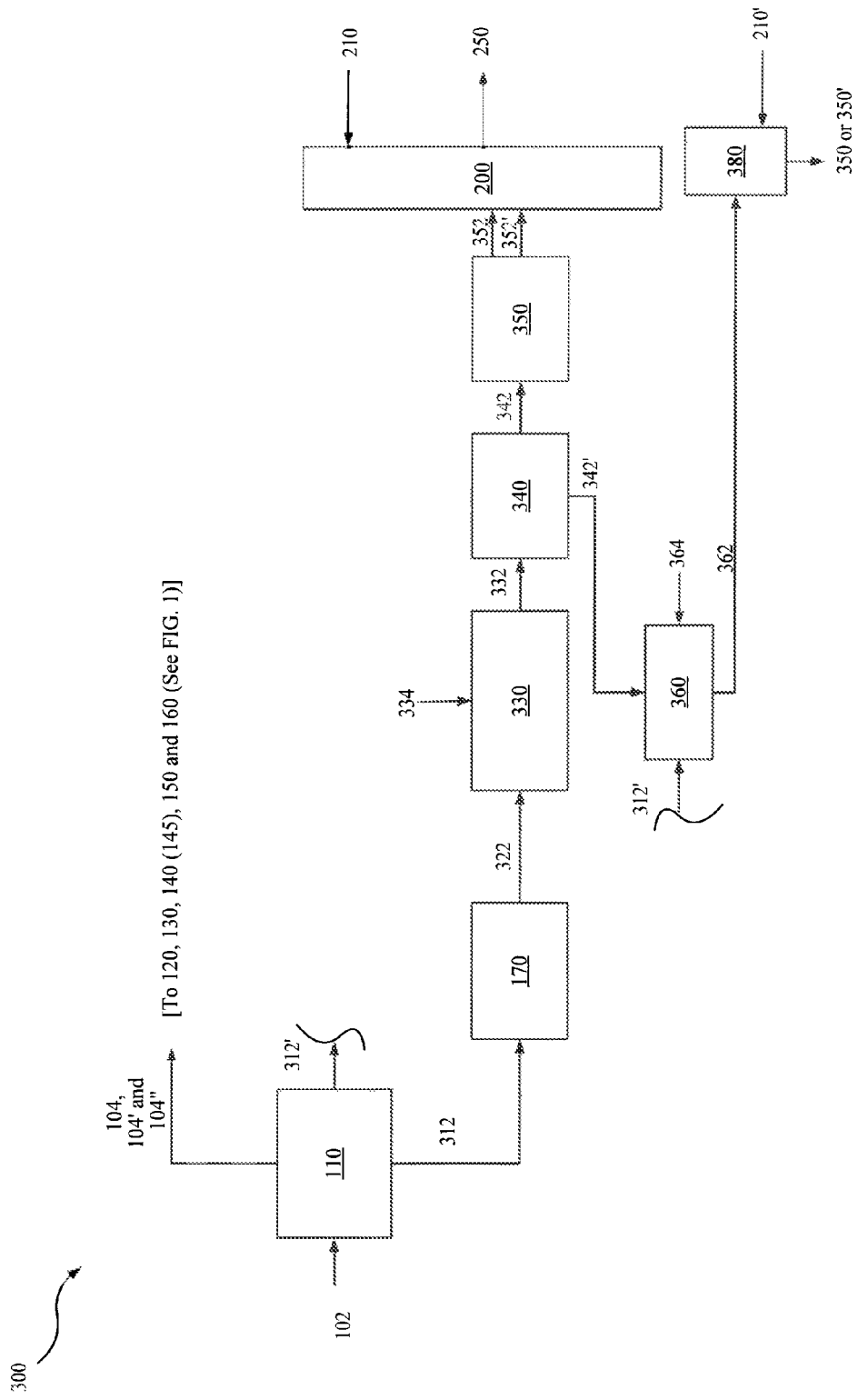
FIG. 2 illustrates a system useful for practicing a process in accordance with an embodiment of the present invention.

Exemplary systems and processes of the present invention are described with reference to FIGS. 1-8. FIGS. 1 and 2 illustrate exemplary oil refineries 100 and 300, respectively, for refining crude oil to gasoline and blending the gasoline or gasoline subgrade with an alcohol.

Figure 3:
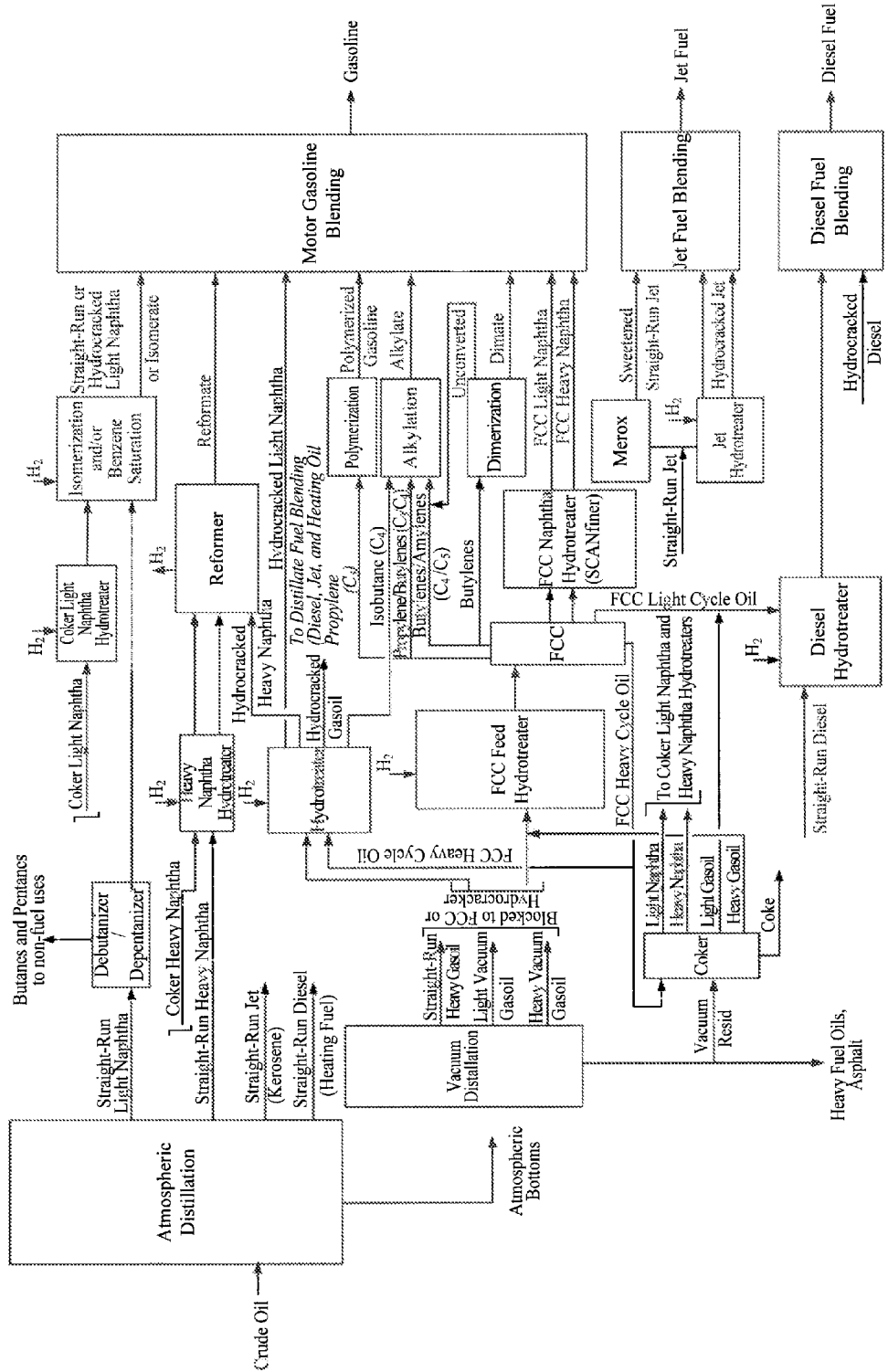
FIG. 3 illustrates a system useful for practicing a process in accordance with an embodiment of the present invention. The operating units for a refinery are depicted, along with descriptions and flows of the oil streams (e.g., feed, intermediates, and products). Crude oil separated roughly by primary distillation (atmospheric and vacuum) is further upgraded in separate processes for gasoline and distillate/diesel fuels. Three units produce mixtures which span the gasoline/distillate boiling range: the hydrocracker, the Fluid Catalytic Cracking (FCC) unit, and the coker. Products from these units are again separated between gasoline and diesel by distillation towers local to the process units. Alternative paths for gasoil upgrading are also depicted: hydrocracking or Fluid Catalytic Cracking (FCC); however, refineries can have one or the other. In Europe, hydrocracking typically favors distillate (diesel) yield and quality. In the U.S., Fluid Catalytic Cracking typically produces more gasoline.

FIG. 3 illustrates an exemplary system of the present invention. Operating units for the refinery are depicted, along with descriptions and flows of the oil streams (e.g., feed, intermediates, and products). Crude oil separated roughly by primary distillation (atmospheric and vacuum) is further upgraded in separate processes for gasoline and distillate/diesel fuels. Three units produce mixtures which span the gasoline/distillate boiling range: the hydrocracker, the Fluid Catalytic Cracking (FCC) unit, and the coker. Products from these units are again separated between gasoline and diesel by distillation towers local to the process units. Alternative paths for gasoil upgrading are also depicted: hydrocracking or Fluid Catalytic Cracking (FCC); however, refineries can have one or the other.

Figure 4:
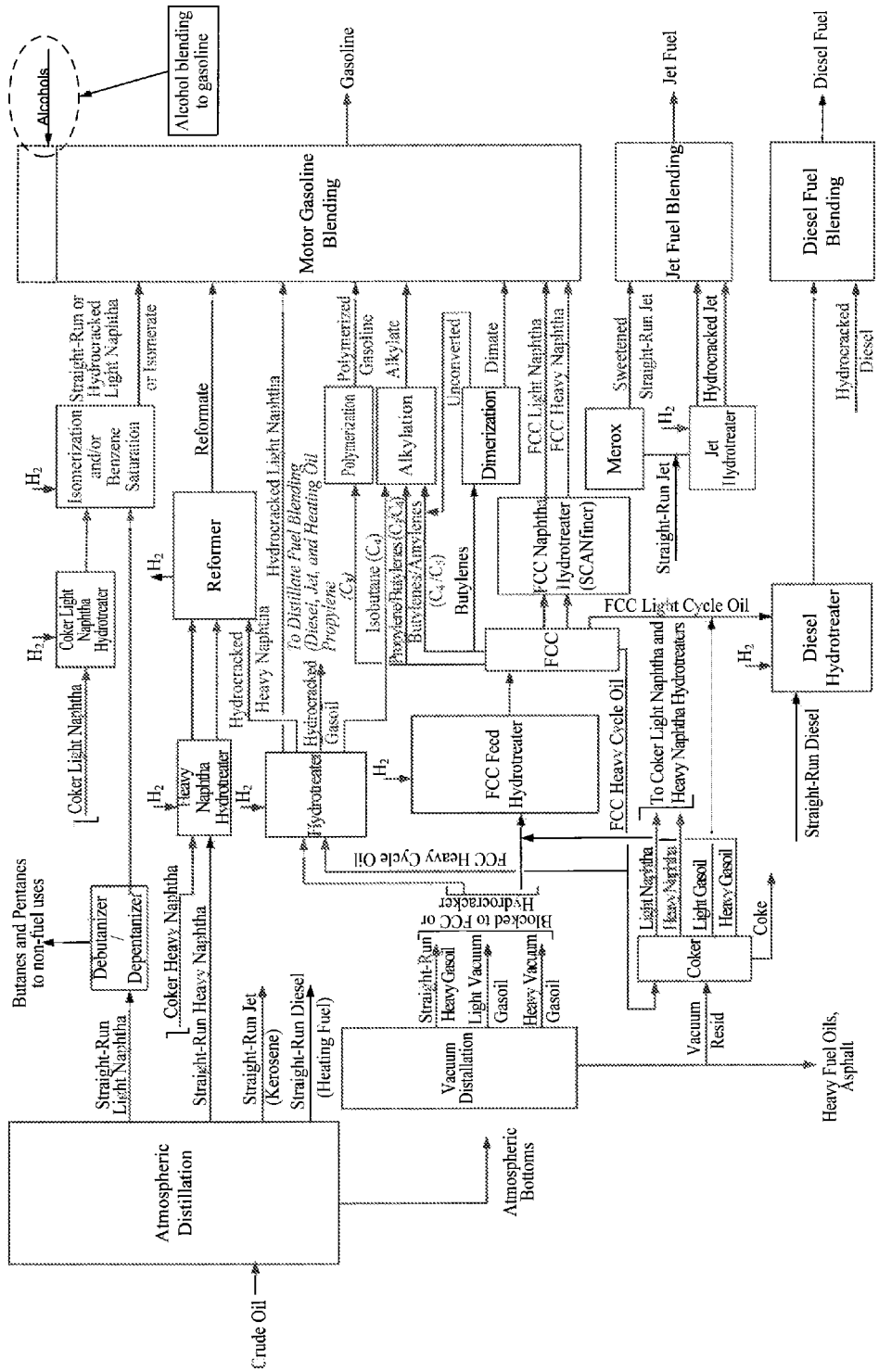
FIG. 4 illustrates a system useful for practicing a process in accordance with an embodiment of the present invention. Most of the alcohol used in gasoline (like ethanol and butanol) enters manufacturing in product blending at the very end of the process. Biobutanol can be blended directly at the refinery, as shown in FIG. 4, for shipment by pipeline or marine vessel as finished gasoline. Ethanol blends, however, would collect fugitive water in pipeline or marine distribution, so ethanol blending must be delayed until the gasoline is loaded on truck transport for final delivery to retail stations. Biobutanol blending has an advantage over ethanol blending because of the ability to blend directly at the refinery and take advantage of lower-cost pipeline shipping.

FIG. 4 illustrates an exemplary system of the present invention. Most of the alcohol used in gasoline (like ethanol and butanol) enters manufacturing in product blending at the very end of the process. Biobutanol can be blended directly at the refinery, as shown in FIG. 4, for shipment by pipeline or marine vessel as finished gasoline. Ethanol blends, however, would collect fugitive water in pipeline or marine distribution, so ethanol blending must be delayed until the gasoline is loaded on truck transport for final delivery to retail stations. Biobutanol blending has an advantage over ethanol blending because of the ability to blend directly at the refinery and take advantage of lower-cost pipeline shipping.

Figure 5:
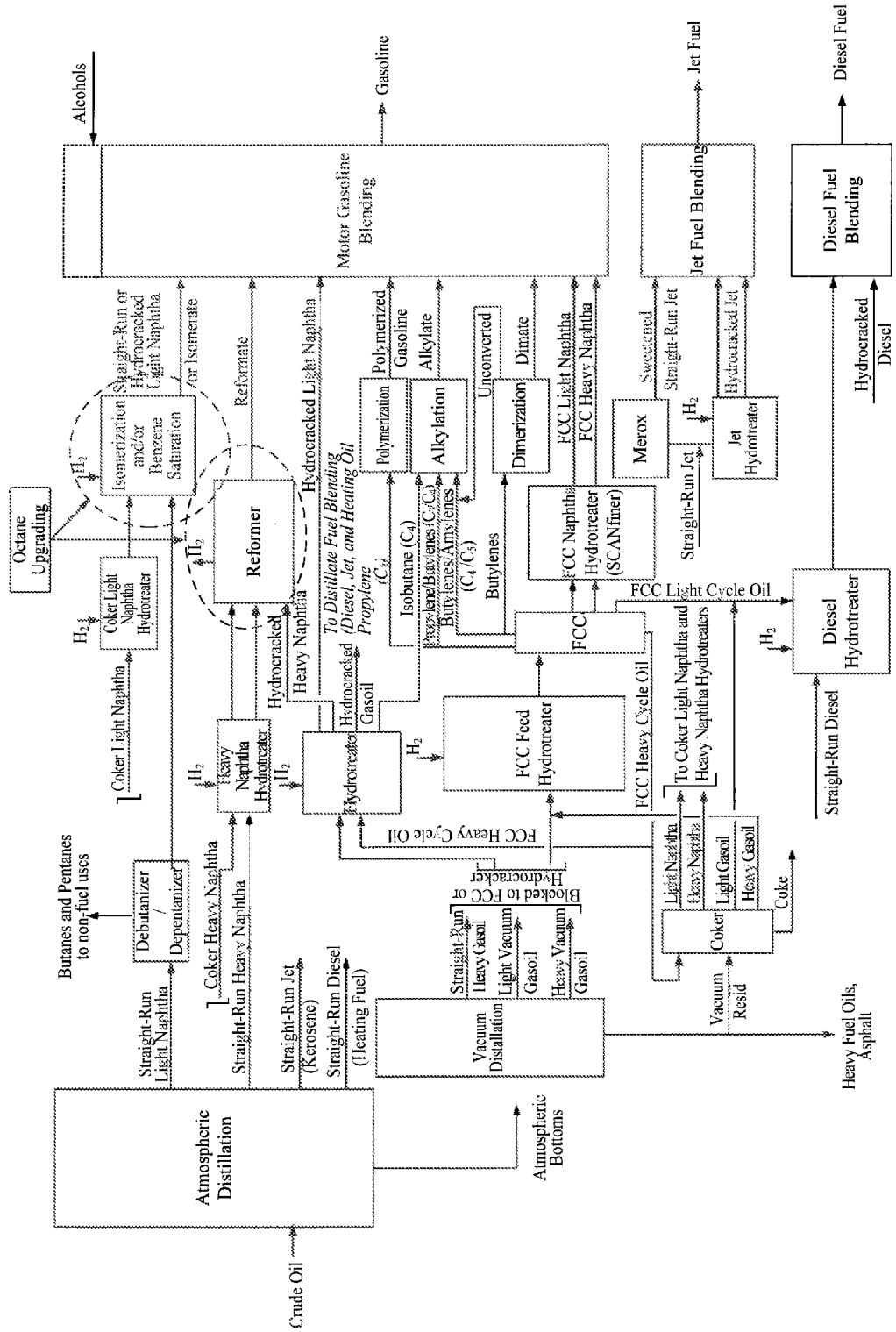
FIG. 5 illustrates the reduced octane processing of a system useful for practicing a process in accordance with an embodiment of the present invention. Ethanol and butanol have relatively high octane values. As a result, blending alcohols reduces the demand on octane upgrading processes of a refinery like reforming and isomerization. The reduction in throughput and severity at these units results in lower costs for energy, process catalysts, and ancillary processes (e.g., water and waste processing). The frequency of unit maintenance turnarounds is also reduced, resulting in higher operating factors (e.g., more days on stream per year). Due to the higher allowable blending ratio of biobutanol (16 vol %) over ethanol (10 vol %), biobutanol is more effective in diluting undesirable controlled substances in gasoline like sulfur and benzene.

FIG. 5 illustrates reduced octane processing of an exemplary system of the present invention. Ethanol and butanol have relatively high octane values. As a result, blending alcohols reduces the demand on octane upgrading processes of a refinery like reforming and isomerization. The reduction in throughput and severity at these units results in lower costs for energy, process catalysts, and ancillary processes (e.g., water and waste processing). The frequency of unit maintenance turnarounds is also reduced, resulting in higher operating factors (e.g., more days on stream per year). Due to the higher allowable blending ratio of biobutanol (16 vol %) over ethanol (10 vol %), biobutanol is more effective in diluting undesirable controlled substances in gasoline like sulfur and benzene.

Figure 6:
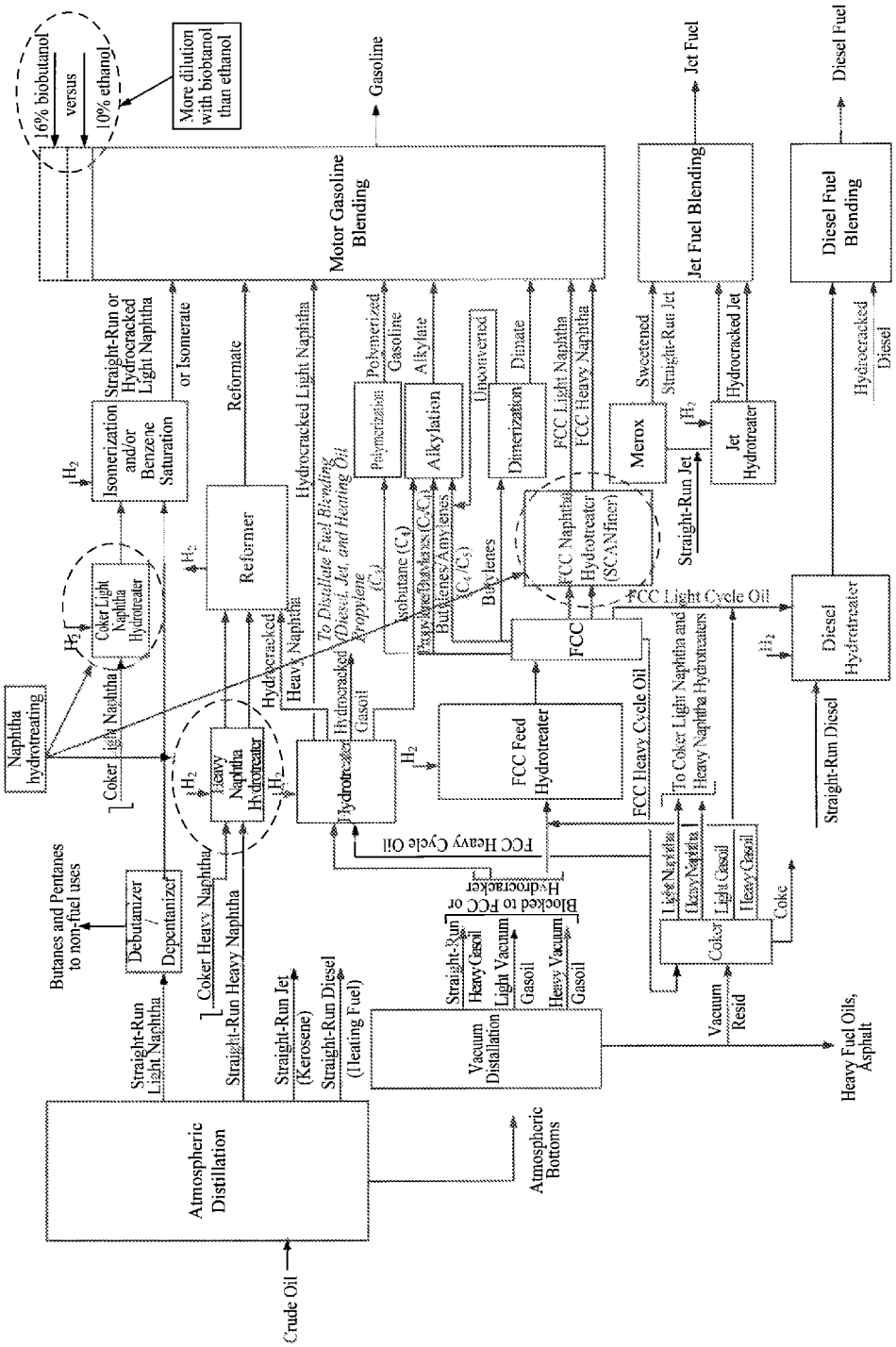
FIG. 6 illustrates the reduced hydrotreating of a system useful for practicing a process in accordance with an embodiment of the present invention. Some gasoline constituents from crude oil, such as sulfur and benzene, are controlled at low maximum concentrations to reduce gasoline emissions (both exhaust and evaporative). Reducing the concentration of aromatics and olefins in gasoline can also be advantageous for emissions control, and dilution by alcohols is similarly effective. Dilution of sulfur is particularly valuable for reducing the severity and throughput of processes which remove sulfur, primarily the naphtha hydrotreating units. Three typical naphtha hydrotreaters are depicted in FIG. 6. The reduction in hydrotreating produces savings in hydrogen consumption, process catalysts, and energy. Similar dilution-based savings can be realized at Isomerization and/or Benzene Saturation units, resulting in lower throughputs and severity for required benzene destruction.

FIG. 6 illustrates reduced hydrotreating of an exemplary system of the present invention. Some gasoline constituents from crude oil, such as sulfur and benzene, are controlled at low maximum concentrations to reduce gasoline emissions (both exhaust and evaporative). Reducing the concentration of aromatics and olefins in gasoline can also be advantageous for emissions control, and dilution by alcohols is similarly effective. Dilution of sulfur is particularly valuable for reducing the severity and throughput of processes which remove sulfur, primarily the naphtha hydrotreating units. Three typical naphtha hydrotreaters are depicted in FIG. 6. The reduction in hydrotreating produces savings in hydrogen consumption, process catalysts, and energy. Similar dilution-based savings can be realized at Isomerization and/or Benzene Saturation units, resulting in lower throughputs and severity for required benzene destruction.

Figure 7:
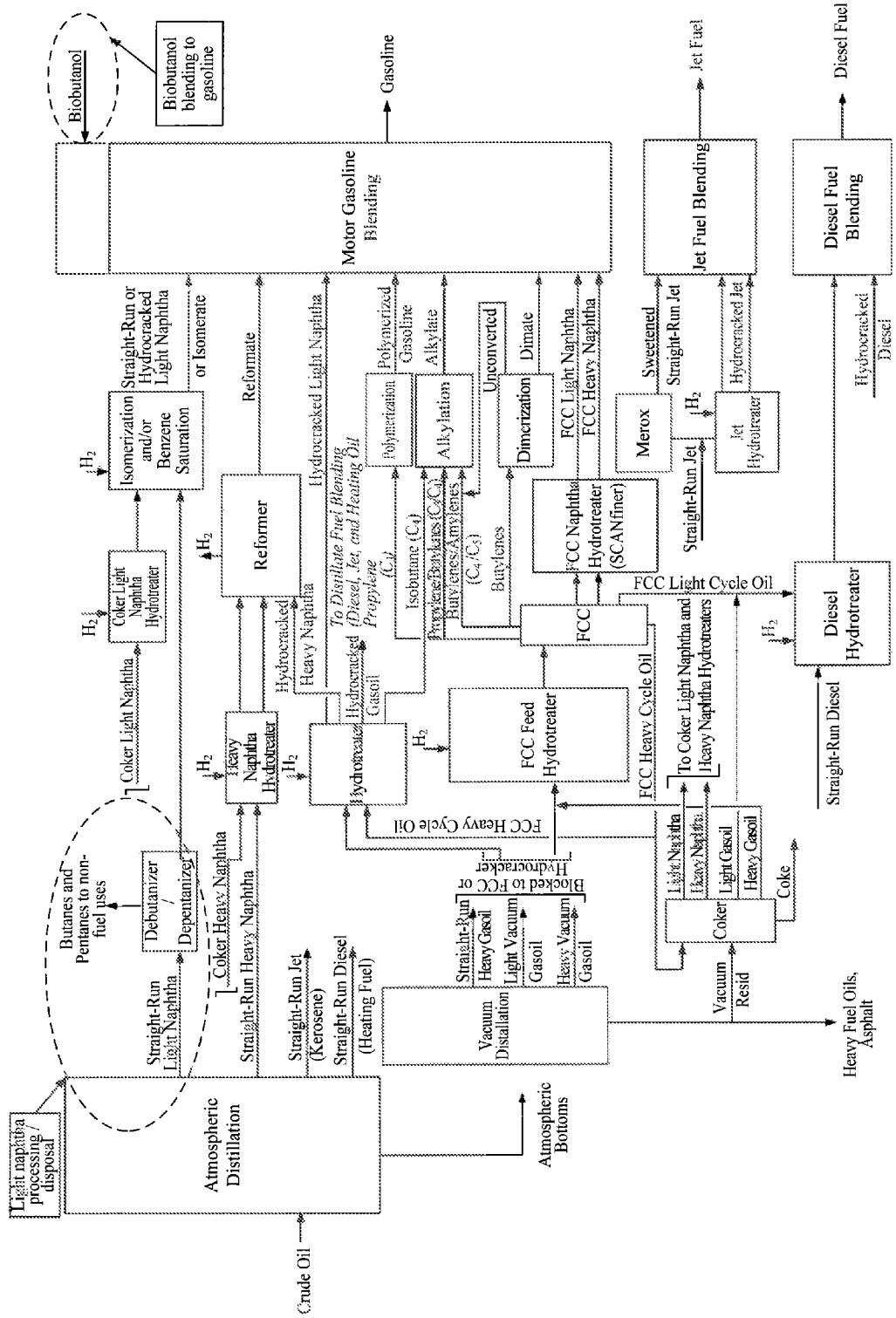
FIG. 7 illustrates the light naphtha, butane, and pentane upgrading of a system useful for practicing a process in accordance with an embodiment of the present invention. Gasoline maximum vapor pressure is controlled by specification, often to low levels which constrain refinery flexibility. Components with high vapor pressure such as light naphtha, pentane, and butane are often sold at low value because they cannot be blended to gasoline without exceeding the maximum vapor pressure limit. Ethanol has a relatively high blending vapor pressure, forcing even higher sales of light hydrocarbons below gasoline value. Biobutanol has a much lower vapor pressure, allowing more light products to be blended to gasoline at higher value.

FIG. 7 illustrates the light naphtha, butane, and pentane upgrading of an exemplary system of the present invention. Gasoline maximum vapor pressure is controlled by specification, often to low levels which constrain refinery flexibility. Components with high vapor pressure such as light naphtha, pentane, and butane are often sold at low value because they cannot be blended to gasoline without exceeding the maximum vapor pressure limit. Ethanol has a relatively high blending vapor pressure, forcing even higher sales of light hydrocarbons below gasoline value. Biobutanol has a much lower vapor pressure, allowing more light products to be blended to gasoline at higher value.

Figure 8:
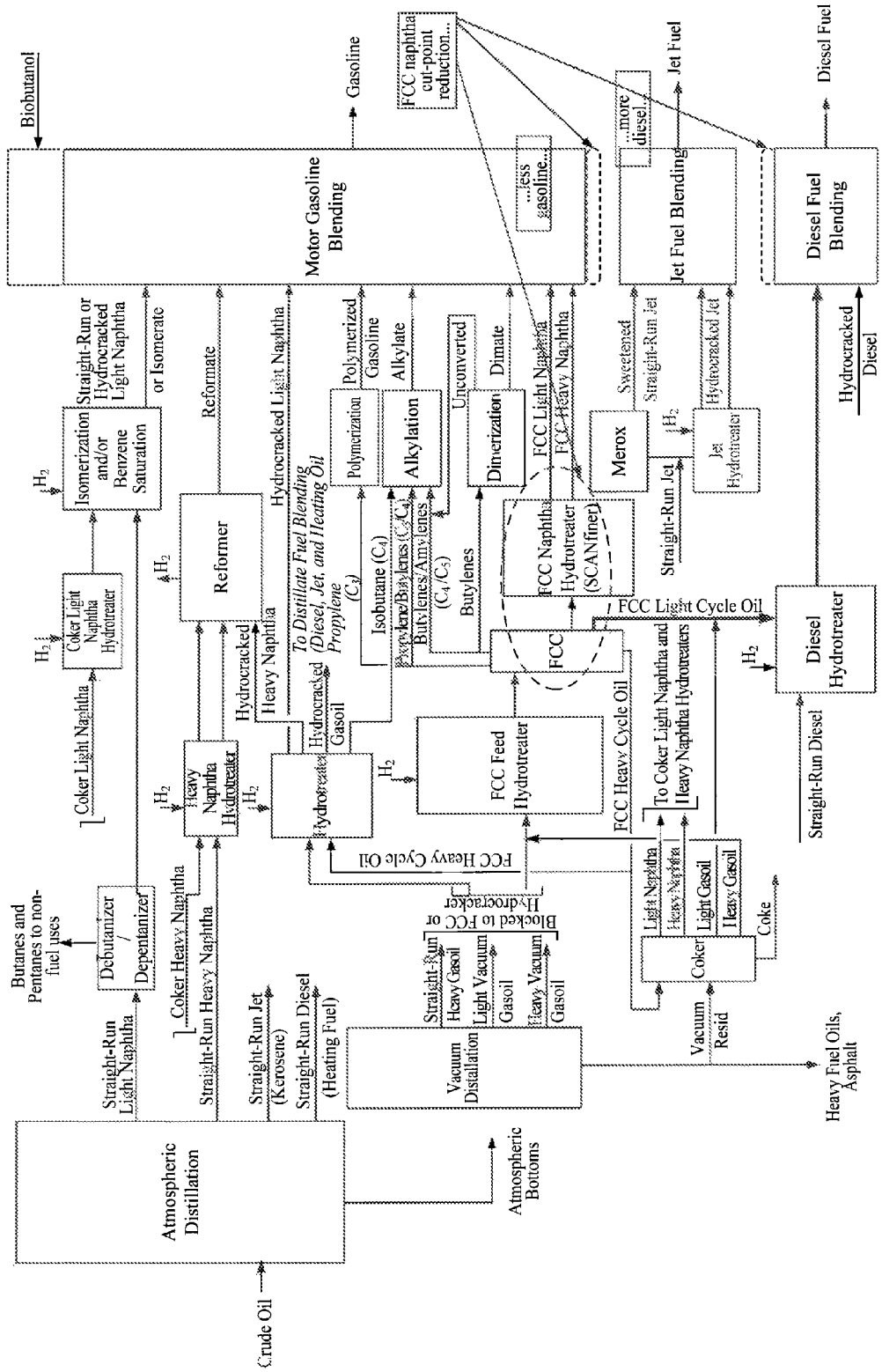
FIG. 8 illustrates the FCC naphtha cut-point reduction of a system useful for practicing a process in accordance with an embodiment of the present invention. To further compensate for the high blending vapor pressure of ethanol, refiners can raise the distillation cut-point between FCC naphthas (used in gasoline) and cycle oils (used in diesel). Increasing the cut-point directs more low-vapor-pressure material into the FCC heavy naphtha, thereby offsetting ethanol's high vapor pressure to keep the overall finished gasoline below specification limits. Although effective in offsetting ethanol's high blending vapor pressure, the practice of raising the FCC naphtha/cycle oil cut-point has several disadvantages: diesel product volume is reduced, which at present results in lower overall value because diesel is more valuable than gasoline; octane processing demand increases because the low-vapor-pressure material added to the FCC heavy naphtha is low octane, effectively giving back some of the octane processing advantage; and throughput and severity at the FCC Naphtha Hydrotreater (SCANfiner) are also increased because more volume of relatively high sulfur material is being processed into the FCC heavy naphtha. Biobutanol's low vapor pressure alleviates the need to source low-vapor-pressure material from the FCC heavy naphtha, allowing FCC naphtha cut-point to return to pre-ethanol levels or even lower; a lower cut-point means more hydrocarbon material is directed to FCC light cycle oil (diesel) and less to FCC heavy naphtha (gasoline). Thus, the choice of biobutanol over ethanol can produce specific refining advantages for increased diesel fuel volume, reduced octane processing, and lower naphtha hydrotreating demand.

FIG. 8 illustrates the FCC naphtha cut-point reduction of an exemplary system of the present invention. To further compensate for the high blending vapor pressure of ethanol, refiners can raise the distillation cut-point between FCC naphthas (used in gasoline) and cycle oils (used in diesel). Increasing the cut-point directs more low-vapor-pressure material into the FCC heavy naphtha, thereby offsetting ethanol's high vapor pressure to keep the overall finished gasoline below specification limits. Although effective in offsetting ethanol's high blending vapor pressure, the practice of raising the FCC naphtha/cycle oil cut-point has several disadvantages: diesel product volume is reduced, which at present results in lower overall value because diesel is more valuable than gasoline; octane processing demand increases because the low-vapor-pressure material added to the FCC heavy naphtha is low octane, effectively giving back some of the octane processing advantage; and throughput and severity at the FCC Naphtha Hydrotreater (SCANfiner) are also increased because more volume of relatively high sulfur material is being processed into the FCC heavy naphtha. Biobutanol's low vapor pressure alleviates the need to source low-vapor-pressure material from the FCC heavy naphtha, allowing FCC naphtha cut-point to return to preethanol levels or even lower; a lower cut-point means more hydrocarbon material is directed to FCC light cycle oil (diesel) and less to FCC heavy naphtha (gasoline). Thus, the choice of biobutanol over ethanol can produce specific refining advantages for increased diesel fuel volume, reduced octane processing, and lower naphtha hydrotreating demand.

While FIGS. 1-8 are described with reference to exemplary alcohol blending processes and systems, it should be understood that depending on the particular alcohol and fuel being blended, the unit operations and process settings thereof can be varied from the exemplary processes and systems of FIGS. 1-8.

In some embodiments, a system of the present invention contains a distillation column to separate to components of crude oil based on differences in the volatilities of the components of the crude oil in a boiling liquid mixture. In some embodiments, the distillation column separates crude oil into light distillate, middle distillate, heavy distillate fractions or any combination thereof. In some embodiments, the distillation column is an atmospheric distillation column. In some embodiments, vacuum distillation can be used to further distill heavy fractions formed by atmospheric distillation.

In a system of the present invention, referring to FIG. 1, crude oil 102 is introduced into an atmospheric distillation column 110. In some embodiments, the heavy distillate 104 is introduced into a vacuum distillation unit 170, forming output distillate 172. The resulting distillate 172 can be introduced into a cracking unit 180, forming output cracked stream 182. In some embodiments, the cracking unit 180 is a hydrocracker unit 180 (see FIG. 1). In some embodiments, the cracking unit 180 is an FCC unit (such as FCC unit 340, see FIG. 2). In some embodiments, the refinery contains a hydrocracker unit and an FCC unit. Referring to FIG. 1, the cracked stream 182 can be introduced into a reformer unit 160, forming output reformate 162.

Alternatively, the resulting distillate 172' is introduced into a coker unit 190, forming a light naphtha coker stream 192 and a heavy naphtha coker stream 192'. In some embodiments, the light naphtha coker stream 192 is introduced into a coker light naphtha hydrotreater 130, forming output stream 132. Hydrogen 134 is consumed during formation of output stream 132. In some embodiments, stream 132 can be introduced into an isomerization unit integrated with a benzene saturation unit 140, forming output stream 142. Hydrogen 144 is consumed during formation of output stream 142.

In some embodiments, the heavy naphtha coker stream 192' is introduced into a heavy naphtha hydrotreater 150, forming output stream 152. Hydrogen 154 is consumed during formation of output stream 152. In some embodiments, the distillate 104" is introduced into a heavy naphtha hydrotreater unit 150, forming output stream 152. In some embodiments, stream 152 is introduced into a reformer unit 160, forming output reformate 162 and output hydrogen stream 164.

In some embodiments, pentanes, butanes, and/or lighter fractions are removed from a light distillate. In some embodiments, a light distillate 104' is introduced into a debutanizer/depentanizer unit 120, forming output debutanized/depentanized stream 122 and butanes and pentanes 124. In some embodiments, debutanized/depentanized stream 122 is introduced into an isomerization unit 145 integrated with a benzene saturation unit 140, forming output stream 142, as shown. In some embodiments, debutanized/depentanized stream 122 is introduced into benzene saturation unit 140, to form a stream (not shown) that is then introduced into a separate isomerization unit (not shown), forming output stream 142.

In some embodiments, a light naphtha stream, reformate stream, cracked stream or any mixture thereof, are combined with an alcohol stream to form a fuel blend. Alternatively, a light naphtha stream, reformate stream, cracked stream or any mixture thereof, are combined together prior to addition of an alcohol stream to form a fuel blend. In some embodiments, such streams are continuously blended at appropriate ratios to achieve their desired concentrations in the final alcohol fuel blend. In reference to FIG. 1, a straight-run light naphtha stream 104', stream 142, reformate stream 162, cracked stream 182', and an alcohol stream 210 are blended to form a fuel blend 250 in a vessel 200 at the refinery.

An alternative oil refinery 300 of the present invention is illustrated in FIG. 2. Referring to FIG. 2, crude oil 102 is introduced into an atmospheric distillation column 110, forming output heavy distillate 312. In some embodiments, the heavy distillate 312 is introduced into a vacuum distillation unit 170, forming output distillate 322. Distillate 322 can be introduced into an FCC Feed hydrotreater unit 330, forming output hydrotreated stream 332. Hydrogen (H$_2$) 334 is consumed during formation of output hydrotreated stream 332. In some embodiments, the hydrotreated stream 332 is introduced into an FCC unit 340, forming output FCC stream 342. In some embodiments, the FCC stream 342 is introduced into an FCC naphtha hydrotreater 350, forming output FCC light naphtha stream 352 and output FCC heavy naphtha stream 352'. FCC light naphtha stream 352 and FCC heavy naphtha stream 352' can be blended with an alcohol stream 210 to form a fuel blend 250 in vessel 200 at the refinery. In some embodiments, the streams of the systems and processes of the present invention are controlled by valves and feedback sensors typical of oil refineries.

In some embodiments, the hydrotreated stream 332 is introduced into an FCC unit 340, to form an output FCC light cycle oil stream 342'. In some embodiments, the output FCC light cycle oil stream 342' is introduced into a diesel hydrotreater unit 360, forming hydrotreated stream 362. In some embodiments, crude oil 102 is introduced into an atmospheric distillation column 110, forming output straight-run diesel stream 312'. In some embodiments, straight-run diesel stream 312' is introduced into diesel hydrotreater 360, forming hydrotreated stream 362. Hydrogen 364 is consumed during formation of output hydrotreated stream 362. In some embodiments, hydrotreated stream 362 can be combined with an alcohol stream 210' to form a diesel fuel blend 350 in vessel 380. In some embodiments, hydrotreated stream 362 can be used to form a diesel fuel 350' in vessel 380. In some embodiments, hydrotreated stream 362 can be combined with a hydrocracked diesel stream 382 (from a hydrocracker unit, e.g., unit 180 of FIG. 1) to form a diesel fuel 350' in vessel 380.

In some embodiments, the introduction of stream 332 to the FCC unit 340 results in the formation of additional streams (not shown), for example, a propylene ($C_3$) stream which can then be polymerized to form polymerized gasoline; a propylene/butylene ($C_3/C_4$) stream and/or butylene/amylene stream ($C_4/C_5$) which can then be alkylated to form an alkylate stream; a butylene stream which can then be dimerized to form a dimate stream, or any mixture thereof. In some embodiments, one or more of such streams can be used for fuel blending in the systems and processes of the invention. As an additional example, a FCC heavy cycle oil stream can result from the introduction of stream 332 to the FCC unit 340. In some embodiments, the FCC heavy cycle oil stream can be introduced into a coker unit to form light naphtha and heavy naphtha streams (which can then be introduced into coker light naphtha and heavy naphtha hydrotreaters), light gasoil stream (which can then be introduced into a diesel hydrotreater), heavy gasoil stream (which can then be introduced into an FCC Feed hydrotreater), and coke.

The remaining unit operations of the refinery 300 are configured the same as described above with reference to the refinery 100 of FIG. 1, with like reference numbers indicating identical or functionally similar elements. Therefore, a detailed discussion of these unit operations of FIG. 2 is omitted.

Fuel blended directly at an oil refinery can be shipped by pipeline or marine vessel as finished gasoline. Ethanol fuel blends can be difficult to ship by such means because ethanol mixes with the water typically present when shipping by pipeline or marine vessel. In some embodiments of the present invention, an oil refinery for the blending of butanol with gasoline allows for butanol to be blended directly at oil refinery 100 or 300 for shipment by pipeline or marine vessel as finished gasoline.

In some embodiments of the present invention, one or more fuel streams are combined together prior to addition of the alcohol stream to form a fuel blend. In some embodiments, one or more fuel streams and an alcohol stream are combined together at the same time to form a fuel blend.

In some embodiments, one or more of the following fuel streams can be combined with an alcohol stream to form a fuel blend of the present invention: straight-run light naphtha, hydrocracked light naphtha, isomerate, reformate stream, polymerized gasoline, alkylate, dimate, FCC light naphtha or FCC heavy naphtha. In some embodiments, the resulting fuel blend is gasoline blend 250 (see embodiments of FIGS. 1 and 2, for example). In reference to FIG. 1, straight-run light naphtha stream 104', stream 142, reformate stream 162, cracked stream 182', and alcohol stream 210 are combined, along with any other necessary components, to form gasoline blend 250 in vessel 200. In reference to FIG. 2, FCC light naphtha stream 352, FCC heavy naphtha stream 352', and alcohol stream 210 can be combined, along with any other necessary components, to form gasoline blend 250 in vessel 200.

In some embodiments, one or more of the following fuel streams can be combined with an alcohol stream to form a fuel blend of the present invention: straight-run jet (kerosene), straight-run diesel (heating fuel), hydrotreated straight-run jet, sweetened straight-run jet (hydrogen sulfide gas removed or reduced), hydrocracked jet, hydrotreated diesel, or hydrocracked diesel. In some embodiments, one or more of the following fuel streams can be combined with an alcohol to form a jet fuel blend (not shown): straight-run jet (kerosene), hydrotreated straight-run jet, sweetened straight-run jet (hydrogen sulfide gas removed or reduced), or hydrocracked jet. In some embodiments, one or more of the following fuel streams can be combined with an alcohol to form diesel fuel blend 350: straight-run diesel (heating fuel), hydrotreated diesel, or hydrocracked diesel.

In some embodiments of the systems and processes presented herein, alcohol stream 210 is ethanol or butanol. In some embodiments of the systems and processes presented herein, alcohol stream 210 is ethanol. In some embodiments of the systems and processes presented herein, alcohol stream 210 is butanol. In some embodiments of the systems and processes presented herein, alcohol stream 210 is biobutanol. In some embodiments of the systems and processes presented herein, alcohol stream 210 is isobutanol.

In some embodiments of the systems and processes presented herein, the component streams are combined via continuous blending to achieve a fuel blend 250, 350 or 350' of a given composition. In some embodiments, the streams are combined via wild stream continuous blending, in which one of the streams has a "wild", or uncontrolled, flow that is monitored, and in which the other streams are metered at the necessary rate based on the rate of the uncontrolled stream so as to achieve a fuel blend 250, 350 or 350' of a given composition. It should be apparent that one or more additional streams, associated valves, etc. can be added as necessary for any additional components of a fuel blend. In some embodiments, alcohol stream 210 or 210' can be fed to vessel 200 or 380 (see FIGS. 1 and 2) from a storage tank located at or near the refinery, or alternatively, can be a continuous process stream immediately exiting a refining section of a production plant, for example. The foregoing component streams can be provided from the same refinery. However, any one of the streams used, can be provided from an outside source, but it is preferred for the present invention that the component streams originate as streams in the refinery on site.

Additionally, the overall carbon dioxide ($CO_2$) emissions for a refinery can be reduced by using butanol in oxygenated fuels. The $CO_2$ emissions for a refinery can be reduced in several ways, including, but not limited to, reduced energy consumption at: (i) reforming units, since the high octane contribution of butanol can lower the need to increase the octane demand, and therefore, can lower the throughput and severity of the reforming units; (ii) isomerization units, since the high octane contribution of butanol can lower the octane demand, and therefore, can lower the throughput and severity of the isomerization units; (iii) benzene saturation units, since the use of butanol, which is generally benzene-free or only contains trace amounts of benzene, can reduce the benzene destruction demand of the refinery, and therefore, can lower the throughput and severity of the benzene saturation units; (iv) naphtha desulfurizing units, since the use of butanol, which is generally sulfur-free or only contains trace amounts of sulfur, can reduce the sulfur concentration of the gasoline pool, and therefore, can lower the throughput and severity at desulfurizing units; and (v) FCC naphtha desulfurizing units, since the use of butanol can lower the FCC naphtha cut-point, which can reduce the concentration of high-sulfur components in the FCC naphtha stream, and therefore, can lower the FCC desulfurizer (ScanFiner) throughput and severity. Additionally, the carbon dioxide ($CO_2$) emissions for the refinery can also be reduced by using butanol in oxygenated fuels insomuch that less crude oil needs to be refined to produce the same amount of fuel.

EXAMPLES

The following comparative examples illustrate the fuel blending processes in accordance with the present invention.

Example 1

Alcohol Blending

Example 1 provides a process model simulation of a biobutanol fuel blending system and process (16 vol % biobutanol in the final blended fuel) that substantially follows a process schematic for oil refinery 100 or 300 shown and as described above with reference to FIGS. 1 and 2, as compared to a substantially equivalent ethanol fuel blending system and process (10 vol % ethanol in the final blended fuel).

Methods:

A process model (LP model) was developed for each of four refining regions: U.S. gulf coast region (USGC), U.S. California region (USCG), U.S. midwest region, and Northwest Europe. LP models were developed using PIMS™ software (Aspen Tech). The reference year for product quality and processing configuration was 2015. Each LP model was representative of the regional refinery processing configurations and constraints and normalized to 100,000 barrels per stream day (bsd) of crude oil capacity. The configurations measured were: USGC heavy sour cracking; U.S. midwest heavy sour coking; California heavy sour coking; and N.W. Europe: configurations of cracking, hydrocracking, and hydroskimming.

The LP model determined refinery operations and maximized profitability (objective function) based on a set of feedstock and product prices. The LP model purchased feedstocks, utilized available process unit capacities and capabilities, accounts for variable operating costs, and produces and sells specification products. Three price sets were used: base case, low case, and high case. The prices represented a 2015 time frame. The input purchase prices for ethanol and biobutanol were set equivalent to the weighted-average finished gasoline price. The difference in the refinery profitability between the ethanol and biobutanol cases for a given scenario represented the gasoline blending value of butanol relative to ethanol.

The following blending properties of biobutanol and ethanol were used:

TABLE 1

Blending Properties of Biobutanol and Ethanol

| Property | Ethanol (denatured) | Biobutanol |
|---|---|---|
| Specific gravity | 0.7880 | 0.8010 |
| Sulfur (ppm) | 20 | 1 |
| Research octane number (RON) | 129 | 109 |
| Motor octane number (MON) | 96 | 90 |
| RON + MON | 112.5 | 99.5 |
| Blending reid vapor pressure (RVP)(psig) | 17.00 | 5.20 |

TABLE 1-continued

Blending Properties of Biobutanol and Ethanol

| Property | Ethanol (denatured) | Biobutanol |
|---|---|---|
| Oxygen content (wt. %) | 33.0 | 21.6 |
| Distillation (vol. %) | | |
| 170° F. | — | 1.0 |
| 200° F. | 100.0 | 10.0 |
| 230° F. | 100.0 | 90.0 |
| 235° F. | 100.0 | 95.0 |
| 240° F. | 100.0 | 99.0 |
| 250° F. | 100.0 | 100.0 |

In addition, USGC and Midwest cases were run with, and without, an ethanol RVP waiver. An ethanol RVP waiver of 1.0 pounds per square inch gauge (psig) on summer grade conventional gasoline does not apply to conventional winter grade, RFG or California Air Resources Board (CARB) gasolines. V/L specification (State requirement, not Federal) was relaxed to accommodate ethanol, in accordance with State regulations. Premium grade gasoline was fixed at 15% of the gasoline pool in the U.S. market.

The regional LP model was compared to actual regional production to ensure the refinery yields were representative, including the gasoline to distillate ratio. The ratio itself was not fixed. Two biobutanol cases were run for each scenario: a constrained case and an unconstrained case. In the biobutanol constrained case, the volume of non-oxygenated gasoline production was held equal to that of the ethanol case. Other operating parameters were allowed to adjust as normal. In the biobutanol unconstrained case, the LP was allowed to adjust the gasoline production volume.

Refineries in the model had two options available to reduce the sulfur content of FCC naphtha. Where available, refineries could utilize vacuum gas oil (VGO) hydrotreating to desulfurize the FCC feedstock and were given unlimited access to FCC naphtha ScanFining. In addition, refineries were given unlimited access to benzene saturation unit capacity to meet benzene specifications. Model U.S. refineries were not given benzene-toluene-xylenes (BTX) capacity. Model European refineries were given the option to sell an aromatics rich reformate stream. With regard to diesel production, all finished production was considered as ultra light sulfur diesel (ULSD) grade. Finally, no specialty products such as solvents and lubricating oils were allowed in the model, except that refineries were allowed to produce asphalt.

Results:

LP model results show that biobutanol has a significant blending advantage and premium value over ethanol. The refinery LP model was highly constrained when blending ethanol into low RVP gasoline, typically requiring selling light naphtha and butane, reducing isomerization and reformer throughputs, and lowering the FCC naphtha cut-point. Contrarily, when biobutanol was used in the blendstock, the LP model determined the refinery would operate similar to when a refinery produces conventional blendstocks (i.e., blendstocks without oxygenates, alcohols, or mixtures thereof). In other words, the LP model predicted that the refinery would return to a more typical historical operation when biobutanol is used as the blendstock.

In addition, the LP model determined that by blending biobutanol or ethanol into the blendstock, some refinery investments were reduced or eliminated mainly by blending down sulfur, benzene and other components such as aromatics. Blending biobutanol permitted expansions/upgrades or changes in feedstock without additional investment in sulfur and benzene reduction and allowed refineries to run such processes at lower throughput.

Example 2

Reduced Octane Processing

Example 2 provides an analysis of a process model simulation of a biobutanol fuel blending system and process (16 vol % biobutanol in the final blended fuel) that substantially follows a process schematic for oil refinery 100 shown and as described above with reference to FIG. 1, as compared to a substantially equivalent ethanol fuel blending system and process (10 vol % ethanol in the final blended fuel) and to a system and process that does not include alcohol blending.

Butanol and ethanol have relatively higher octane values compared to the other components routinely blended to make a finished gasoline. Analysis of the LP model results described in Example 1 showed that a biobutanol blending system and process for USCG gasoline resulted in a 17% to 41% reduction in octane upgrading unit throughput (i.e., combined isomerization unit and reformer unit throughputs) of a refinery compared to the comparable refinery that does not blend with alcohol. Analysis of the LP model output also showed that a biobutanol blending system and process for USCG gasoline resulted in an up to 15% reduction in octane upgrading unit throughput (i.e., combined isomerization unit and reformer unit throughputs) of a refinery compared to the comparable refinery that blends with ethanol. Therefore, based on the LP model, the blending of an alcohol with gasoline reduced the throughput and severity on octane upgrading units of an oil refinery, such as reforming and isomerization. In addition, the blending of butanol with gasoline further reduced the throughput and severity on one or more octane upgrading units of an oil refinery due to the higher allowable blending ratio of butanol (16 vol %) compared to ethanol (10 vol %), the reduction in the FCC cut-point, and reduced hydrotreating.

Example 3

Reduced Hydrotreating, Isomerization and/or Benzene Saturation

Example 3 provides an analysis of a process model simulation of a biobutanol fuel blending system and process (16 vol % biobutanol in final blended fuel) that substantially follows a process schematic for oil refinery 100 shown and as described above with reference to FIG. 1, as compared to a substantially equivalent ethanol fuel blending system and process (10 vol % ethanol in the final blended fuel) and system and process that does not include alcohol blending.

Analysis of the LP model results described in Example 1 showed that a biobutanol blending system and process for USCG gasoline resulted in a 15% to 97% reduction in FCC scanfining (hydrotreating) unit throughput of a refinery compared to the comparable refinery that does not blend with alcohol. Analysis of the LP model output also showed that a biobutanol blending system and process for USCG gasoline resulted in an up to 98% reduction in FCC scanfining (hydrotreating) unit throughput of a refinery compared to the comparable refinery that blends with ethanol. As such, based on the LP model, the blending of an alcohol with gasoline diluted the amount of undesirable controlled substances in gasoline, such as benzene and sulfur, and reduced the throughput and severity on one or more of the hydrotreating, isomerization and benzene saturation units of an oil refinery.

Example 4

Light Naphtha Upgrading

Example 4 provides an analysis of a process model simulation of a biobutanol fuel blending system and process (16 vol % biobutanol in final blended fuel) that substantially follows a process schematic for oil refinery 100 shown and as described above with reference to FIG. 1, as compared to a substantially equivalent ethanol fuel blending system and process (10 vol % ethanol in the final blended fuel).

The maximum allowable vapor pressure of gasoline is controlled by known specifications that vary by geographic region and season. Often such maximum allowances constrain the flexibility of oil refineries in the production of gasoline. Components of an oil refinery that typically have high vapor pressure include light naphtha, pentane and butane. Such components are typically utilized by oil refineries for non-gasoline purposes (e.g., selling them at a relatively lower value) because they cannot be blended with gasoline without exceeding the maximum allowable vapor pressure for gasoline.

Analysis of the LP model results described in Example 1 showed that a biobutanol blending system and process for USCG gasoline results in a 3% to 13% increase in light naphtha and benzene utilization compared to the comparable refinery that blends with ethanol. Thus, the blending of butanol with gasoline allowed an oil refinery to blend more high vapor pressure components in gasoline due to the higher allowable blending ratio of butanol (16 vol %) compared to ethanol (10 vol %).

Example 5

FCC Naphtha Cut-Point Reduction

Example 5 provides an analysis of a process model simulation of a biobutanol fuel blending system and process (16 vol % biobutanol in the final blended fuel) that substantially follows a process schematic for oil refinery 300 shown and as described above with reference to FIG. 2, as compared to a substantially equivalent ethanol fuel blending system and process (10 vol % ethanol in the final blended fuel).

In an oil refinery for blending ethanol with gasoline, the distillation cut-point between the FCC naphthas used in gasoline and the cycle oils used in diesel is raised to compensate for the relatively high blending vapor pressure of ethanol. Increasing the cut-point directs more low vapor pressure material into the FCC heavy naphtha, thereby offsetting ethanol's high vapor pressure to keep the gasoline within specification limits.

Analysis of the LP model results described in Example 1 showed that a biobutanol blending system and process for summer grade gasoline resulted in a 4% to 7% increase in distillate yield compared to compared to the comparable refinery that does not blend with alcohol or that blends with ethanol (see also results of Examples 2 and 3). Thus, based on the LP model, in an oil refinery for the blending of butanol with gasoline, the distillation cut-point is lower than the cut-point for an oil refinery for the blending of ethanol, which results in increased diesel product volume, decreased octane processing, and decreased throughput and severity on the FCC naphtha hydrotreater 350.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

All publications, patents and patent applications mentioned in this specification are indicative of the level of skill of those skilled in the art to which this invention pertains, and are herein incorporated by reference to the same extent as if each individual publication, patent or patent application was specifically and individually indicated to be incorporated by reference.

What is claimed is:

1. A method for producing a butanol blended gasoline, comprising:
   (a) operating an oil refinery to produce a light distillate product from crude oil, wherein the oil refinery comprises one or more octane upgrading units;
   (b) feeding a naphtha feedstock to the one or more octane upgrading units to convert the naphtha feedstock to an upgraded naphtha product having a higher octane than an octane of the naphtha feedstock, wherein the light distillate product comprises the upgraded naphtha product; and
   (c) forming a blend of at least the light distillate product and an amount of butanol to produce a butanol blended gasoline, wherein the amount of upgraded naphtha product in the butanol blended gasoline is from about 10% to about 50% by volume of the gasoline,
   wherein throughput for the octane upgrading unit is less than throughput for the octane upgrading unit when the oil refinery is operated to produce a different light distillate product which is an automotive-grade gasoline free of alcohol.

2. The method of claim 1, wherein the amount of upgraded naphtha product in the butanol blended gasoline is from about 10% to about 45% by volume of the gasoline.

3. The method of claim 1, wherein the amount of upgraded naphtha product in the butanol blended gasoline is from about 15% to about 45% by volume of the gasoline.

4. The method of claim 1, wherein the amount of upgraded naphtha product in the butanol blended gasoline is from about 20% to about 45% by volume of the gasoline.

5. The method of claim 1, wherein the amount of upgraded naphtha product in the butanol blended gasoline is from about 25% to about 45% by volume of the gasoline.

6. The method of claim 1, wherein the amount of upgraded naphtha product in the butanol blended gasoline is from about 30% to about 45% by volume of the gasoline.

7. The method of claim 1, wherein the amount of upgraded naphtha product in the butanol blended gasoline is from about 30% to about 43% by volume of the gasoline.

8. The method of claim 1, wherein the light distillate product comprises gasoline.

9. The method of claim 1, wherein the butanol comprises isobutanol.

10. The method of claim 1, wherein the upgraded naphtha product comprises the throughput product of a catalytic reformer unit.

11. The method of claim 1, wherein the upgraded naphtha product comprises the throughput product of an isomerization unit.

12. The method of claim 1, wherein the amount of butanol that is blended with the light distillate product is at least about 5 vol % of the butanol blended gasoline.

13. The method of claim 1, wherein the amount of butanol that is blended with the light distillate product is at least about 7 vol % of the butanol blended gasoline.

14. The method of claim 1, wherein the amount of butanol that is blended with the light distillate product is at least about 10 vol % of the butanol blended gasoline.

15. The method of claim 1, wherein the amount of butanol that is blended with the light distillate product is from about 10 vol % to about 16 vol % of the butanol blended gasoline.

16. The method of claim 1, wherein the amount of butanol that is blended with the light distillate product is from about 16 vol % to about 24 vol % of the butanol blended gasoline.

17. The method of claim 1, wherein the amount of butanol that is blended with the light distillate product is about 16 vol % of the butanol blended gasoline.

18. The method of claim 1, wherein the butanol blended gasoline is an automotive-grade gasoline.

19. The method of claim 1, wherein the butanol comprises biobutanol.

20. The method of claim 1, wherein the blending is at the refinery.

21. The method of claim 1, wherein the blending is in close proximity to the refinery.

22. The method of claim 1, wherein the butanol-gasoline blend satisfies vapor pressure regulatory requirements.

* * * * *